US011009744B2

(12) United States Patent
Tydtgat et al.

(10) Patent No.: US 11,009,744 B2
(45) Date of Patent: May 18, 2021

(54) FRONT-LIT REFLECTIVE DISPLAY

(71) Applicant: BARCO N.V., Kortrijk (BE)

(72) Inventors: Claude Daniel Tydtgat, Ledegem (BE); Bart Van Den Bossche, Kuurne (BE)

(73) Assignee: BARCO N.V., Kortrijk (BE)

( * ) Notice: Subject to any disclaimer, the term of this patent is extended or adjusted under 35 U.S.C. 154(b) by 0 days.

(21) Appl. No.: 16/633,611

(22) PCT Filed: Jul. 25, 2017

(86) PCT No.: PCT/EP2017/068815
§ 371 (c)(1),
(2) Date: Jan. 24, 2020

(87) PCT Pub. No.: WO2019/020173
PCT Pub. Date: Jan. 31, 2019

(65) Prior Publication Data
US 2020/0225517 A1 Jul. 16, 2020

(51) Int. Cl.
*G02F 1/13357* (2006.01)

(52) U.S. Cl.
CPC ............ *G02F 1/1336* (2013.01); *G02F 2001/133616* (2013.01)

(58) Field of Classification Search
None
See application file for complete search history.

(56) References Cited

U.S. PATENT DOCUMENTS

| 6,781,647 B2 | 8/2004 | Fujieda |
| 6,879,354 B1 | 4/2005 | Sawayama et al. |
| 7,630,027 B2 | 12/2009 | Koma |
| 2002/0122144 A1 | 9/2002 | Yoshida et al. |

OTHER PUBLICATIONS

International Search Report and Written Opinion in corresponding PCT/EP2017/068815 dated Oct. 19, 2017.
International Preliminary Report on Patentability in corresponding PCT/EP2017/068815 dated Feb. 6, 2020.

*Primary Examiner* — Vip Patel
(74) *Attorney, Agent, or Firm* — Bacon & Thomas, PLLC

(57) ABSTRACT

A reflective display device and a method of making or operating the display device, where the reflective display device includes a spatial reflective light valve, at least one light emitting element being positioned in front of the spatial reflective light valve and light shaping device to direct the light generated by the at least one light emitting element in defined directions with respect to the spatial reflective light valve. This makes use of the fact that the contrast improves and the diffuse reflection component of the reflective display increases when the illumination direction gets closer to the perpendicular direction but rays close to the perpendicular direction need to be reduced in intensity or better still avoided to reduce the specular component. This can use illumination directions close to the perpendicular direction while preventing or reducing specular reflection within a range of incident angles.

20 Claims, 18 Drawing Sheets

Fig. 1
Fig. 1A
(PRIOR ART)
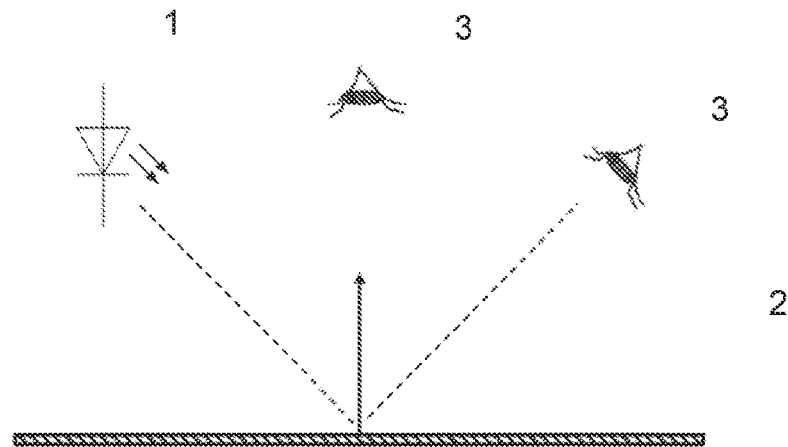
Fig. 1B
(PRIOR ART)
Fig. 2
(PRIOR ART)
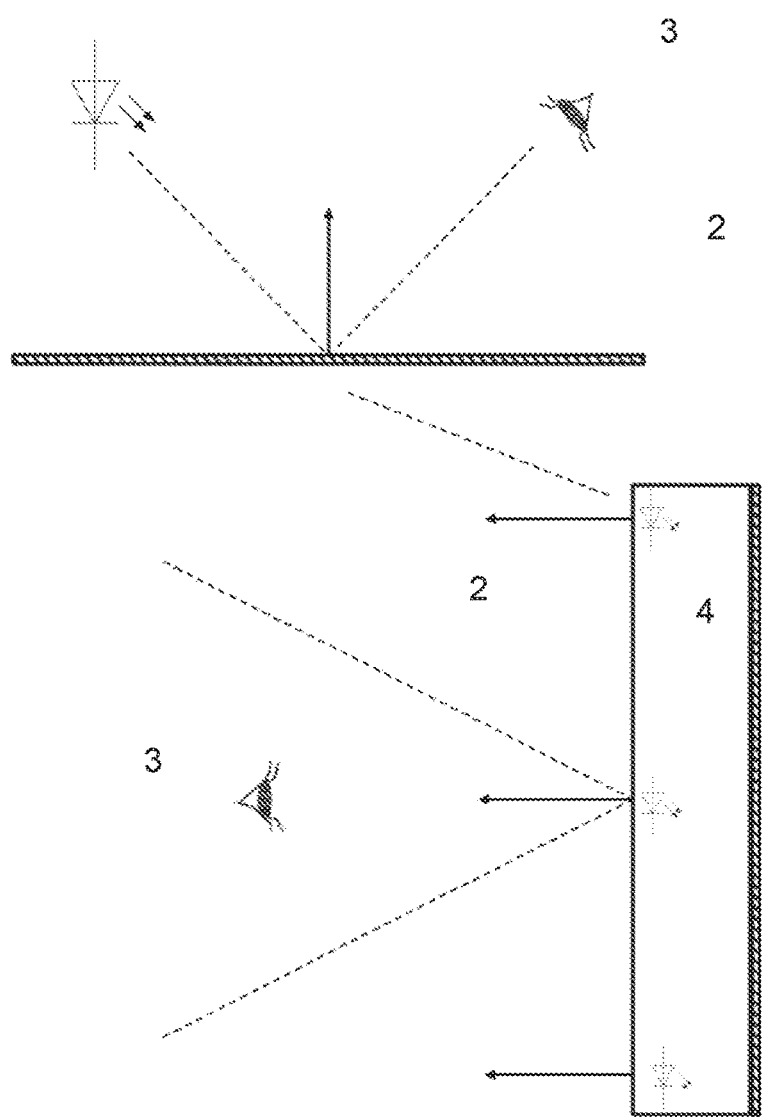

FRONT-LIT REFLECTIVE DISPLAY

The present invention relates to a method of making or operating a reflective display device as well as to a reflective display device, wherein the reflective display device comprises a spatial reflective light valve such as comprising an array or matrix of addressable reflective pixel elements, at least one light emitting element being positioned in front of the spatial reflective light valve such as comprising the reflective pixel elements.

BACKGROUND

As shown schematically in FIGS. 1A and 1B, typically a reflective display 1 has a top layer 2 like a top protective glass plate whereupon there is an anti-reflective coating. Below these layers an active addressable pixelated reflective layer forms the image and creates some diffusion to generate a perceivable image (as shown schematically). Without this diffusion, the reflective display would behave more like a mirror and readability would be reduced. The reflectivity is a combination of a diffuse term and a specular term. When viewing a reflective display in daylight condition there is always a chance that the sun will directly reflect into the eyes of the viewer 3 destroying the readability. If the viewer 3 turns the body position relative to the display the specular reflection is not seen as the viewer looks into the diffuse part of the reflection.

Reflective displays can make use of side-lit systems with disturbances or "notches" in the front glass plate. Drawbacks can be:
1. In the case of a reflective display the area occupied by the front disturbances must be very small, let's say up to maximum 2% area. This means that light outcoupling will be weak and a lot of light will be lost due to back and forth bouncing. Very good mirrors are needed at the sides to avoid losses. Even with very good mirrors there will be a lot of losses.
2. To create a uniform illumination the disturbance concentration should be adapted spatially. However a certain design can only work for one particular size. When the front plate gets larger, a new disturbance pattern design is needed. The disturbance method is not "tileable".
3. The side lit method is not "tile-able" as the illumination source is at the sides as well thus limiting the width of the device.
4. The front disturbances will also generate point sources which may become visible because the specular reflection.

As shown schematically in FIG. 2, discrete light sources 4 such as LEDs can be embedded into the top layer 2, which illuminate the reflective display. The LED's are inside the top glass plate at a distance of for instance 10 mm from the surface of the display so as to generate enough overlap between adjacent LED illumination patterns. LEDs typically have a wide emission profile so that the emitted rays have practically all angles with respect to the reflective display, from perpendicular up to almost 90 degrees with respect to the surface. When viewing the display, the eye behaves as a lens creating an image on the retina of the object it is looking at. As the reflective display behaves partially as a mirror due to the specular reflection component, the front-light illumination LEDs will create a bright spot on the retina. In fact this spot will be brighter than the diffuse component so that the eye will focus easily on the specular reflection of these LEDs. The specular image of the LEDs will be seen from all possible angles when looking towards the reflective display as there will always be specular reflecting rays going into the eye. As the LEDs emit in all directions, there is always a possibility to draw a light cone hitting the eye lens which creates an LED image on the retina. The eye will perceive the image due to the diffuse reflection of the display superimposed onto images of the LED's or onto a uniform bright plane is there are illuminated LEDs.

U.S. Pat. No. 7,630,027 describes a front light illumination systems for reflective displays integrated in the display itself are known from the art. Light sources like e.g. Light Emitting Diodes are positioned right in front of a matrix of reflective pixels, between the reflective pixels and a viewer looking at the display.

In U.S. Pat. No. 6,781,647 "Liquid crystal display device having a front light unit" a reflective liquid crystal display is described wherein the Liquid Crystal Display device includes an LCD unit and a front light unit disposed in front of the LCD unit. The front light unit has a transparent electrode, an organic Electro-Luminescent (EL) layer and a patterned non-transparent electrode. The non-transparent electrode has a mesh structure for defining light emission areas and transparent areas of the organic EL layer, which are arranged alternately. The light emitted by the light emission areas irradiates the LCD unit. The light reflected by reflective members of the LCD unit passes through the transparent areas of the organic EL layer and reaches the viewer.

FIG. 1 of U.S. Pat. No. 6,781,647 shows a schematic representation of such a display. The front light unit 10 and the LCD unit 20 may be arranged with an air gap disposed therebetween, or may be fixed together using a transparent adhesive. The transparent substrate 11 of the front light unit 10 is a glass plate, plastic substrate, film substrate or the like, having a thickness of approximately 0.3 to 1 mm. The transparent electrode 12 is formed by sputtering indium tin oxide (ITO), for example, across the entire surface of the transparent substrate 11. Known examples of the structure for the organic EL layer 13 include a two-layered structure including a luminescence layer and a hole injection/transport layer, a three-layered structure including an additional electron injection/transport layer to the two-layered structure, and another structure incorporating therein an additional thin insulating film formed at the interface with the metallic electrode in the two- or three-layered structure.

The non-transparent electrode 14 is formed, for example, by vacuum evaporation of a material such as an alloy of aluminum and lithium through a metallic shadow mask, to yield a layer approximately 200 nm thick. Finally, in order to protect the organic EL layer 13 against oxygen and moisture, a protective layer 15 made of a metallic oxide, or a metallic sulfide or the like is provided over the entire surface. Alternatively, instead of forming the protective layer 15, a package structure may also be formed by covering all the elements with a plastic cover, and then replacing the air inside the plastic cover with an inert gas such as nitrogen or argon.

By applying a source voltage to the light emission area of the organic EL layer 13 sandwiched between the transparent electrode 12 and the stripe sections of the non-transparent electrode 14, with the transparent electrode 12 functioning as the anode and the non-transparent electrode 14 as the cathode, the organic EL layer 13 functions as a white light emitting diode with three light emission peaks.

One problem is that a part of the light emitted by the light source does not travel towards the reflective pixels of the display panel, but instead travels towards the viewer (that light is also known as "leakage light") without having been reflected by the LCD unit. As a result, the illumination efficiency is reduced and the leakage light causes low contrast ratio of the liquid crystal display device leading to deterioration in the quality of the display. U.S. Pat. No. 6,781,647 ignores the specular reflection of the LEDs on the LCD unit. The LEDs illuminating the reflective display can be visible as bright spots on the LCD unit.

US20020122144 "Illumination device and manufacturing method therefor, display device and electronic instrument" describes a similar front lit reflective display: as represented on FIG. 2 thereof, the front light illumination system comprises a transparent substrate 240 having light emitting elements which are disposed on a surface thereof and which emit light, and the light emitting elements 250 are provided with at least a transparent electrode 253, a light emitting layer 252 (in this case an electroluminescent material), and a reflective electrode 251, in that order, from the outgoing surface of the transparent substrate. The light emitting element is in a cavity 232 in a transparent layer 231.

The reflective electrode functions as a cathode electrode of the light emitting element and reflects light emitted from the light emitting layer of a light emitting element, and then the reflected light travels towards a transparent electrode that functions as an anode electrode. As represented on FIG. 2, the light emitted by the light emitting elements in the direction of the viewer is reflected by the reflective electrode towards the reflective pixels of the display.

The light emitted by the front light illumination systems is directed towards reflective pixels (e.g. from an LCD panel) and undergoes both specular reflection and diffuse reflection when it impinges on the reflective pixels. Because of the specular reflection, the light emitting elements can be seen as bright spots.

The art needs improvement. Discrete light sources become visible through the specular component of the display. An antiglare coating on the top glass plate only avoids specular reflections partially and generally creates some ambient light reflection which degrades contrast and also widens the viewing angle with the effect of a reduced reflectivity in the front direction, reducing contrast and brightness further.

SUMMARY OF THE INVENTION

In an aspect of the present invention means are provided for a reflective display having discrete light sources mounted on a front transparent layer to avoid the discrete light sources from becoming visible through the specular component of light reflected by a spatial reflective light modulator or valve.

It is an advantage of embodiments of the present invention to deal with specular reflection of light generated by light sources within a reflective display device and directed towards a spatial reflective light modulator or valve such as comprising reflective pixel elements of the reflective display device. A further advantage is that at the same time the efficiency can be improved with which the light is used.

In a first aspect of the present invention, a reflective display device comprises a spatial reflective light modulator or valve such as comprising an array or matrix of addressable reflective pixel elements, at least one light emitting element being positioned in front of the spatial reflective light modulator or valve such as comprising the array or matrix of addressable reflective pixel elements, a transparent layer positioned at least in part between the at least one light emitting element and the spatial reflective light modulator or valve such as comprising the array or matrix of addressable reflective pixel elements and light shaping means to direct the light generated by the at least one light emitting element in preferred directions. The preferred directions can exclude one or more intervals of angles of light incident on the spatial reflective light modulator or valve such as comprising the reflective pixel elements. The incident light is light from the at least one light emitting element. The preferred directions can include and preferably can consist of one or more intervals of angles of incidence on the spatial reflective light modulator or valve such as comprising the reflective pixel elements. For a plurality of light emitting elements, light from each of the light emitting elements may be constrained to emit in or within the preferred directions.

It is an advantage of the present invention that light emitted by the at least one light emitting element will not impinge on the spatial reflective light modulator or light valve such as comprising the reflective pixel elements within certain intervals of the angle of incidence, thereby preventing or reducing specular reflection in known or knowable directions. The reduction or absence of specular reflection in known or knowable directions means that there are preferred directions along which a viewer will not see specular image(s) of the at least one light emitting element on the spatial reflective light valve such as comprising the array or matrix of reflective pixel elements or will only see weakened images of the same, e.g. weakened images at some angles.

In a further aspect of the present invention, the light shaping means concentrates the light in one or more authorized angular ranges to increase the efficiency with which the light is used. This further contributes to improving the contrast ratio and brightness of the display device.

The light shaping means can direct the light emitted by the at least one light emitting element by refraction, reflection or a combination of both.

The light shaping means can be a volume of transparent material having a surface, the transparent material having an index of refraction different from the index of refraction of the transparent layer. The volume of transparent material can be positioned between the light emitting element and the spatial reflective light modulator or light valve such as comprising the reflective pixel elements.

The volume of transparent material can be shaped like a lens and have an axis of symmetry. The volume of transparent material can be or can also be asymmetrical.

The light shaping means can be a cavity in the transparent layer. The cavity can be cone or pencil shaped and can enclose the at least one light emitting element. The cavity can be filled with a material with an index of refraction smaller than the index of refraction of the transparent layer. The material can be a gas, for instance air or nitrogen.

Other geometries are possible for the cavity like e.g. pyramidal with a square base, obelisk, parallelepiped with or without a pyramidion etc.

The light shaping means can be a surface with a first reflective side and a second absorbing or diffusive side. The first reflective side intercepts light emitted by the at least one light emitting element and redistributes it in preferred angular ranges or intervals of an angle of incidence, thereby preventing or reducing specular reflection in known or knowable directions.

In a further aspect of the present invention a method of operating a reflective display device is provided, the device comprising a spatial reflective light modulator or valve, at least one light emitting element being positioned in front of the spatial reflective light modulator or valve, and a transparent layer positioned at least in part between the at least one light emitting element and the spatial reflective light modulator or valve, the method comprising directing the light generated by the at least one light emitting element in defined directions with respect to the spatial reflective light modulator or valve.

Some further embodiments of the present invention are defined in dependent claims.

BRIEF DESCRIPTION OF THE FIGURES

FIGS. 1A and 1B show schematic sectional views showing a LCD device known from the art and having a front light unit.

FIG. 2 shows a schematic sectional view showing a LCD device known from the art and having a front light unit with means for reflecting light towards the reflective pixel elements.

FIG. 22 shows a reflective display making use of a front lighting dispositive according to an embodiment of the present invention.

DEFINITIONS AND ACRONYMS

Figure 3:
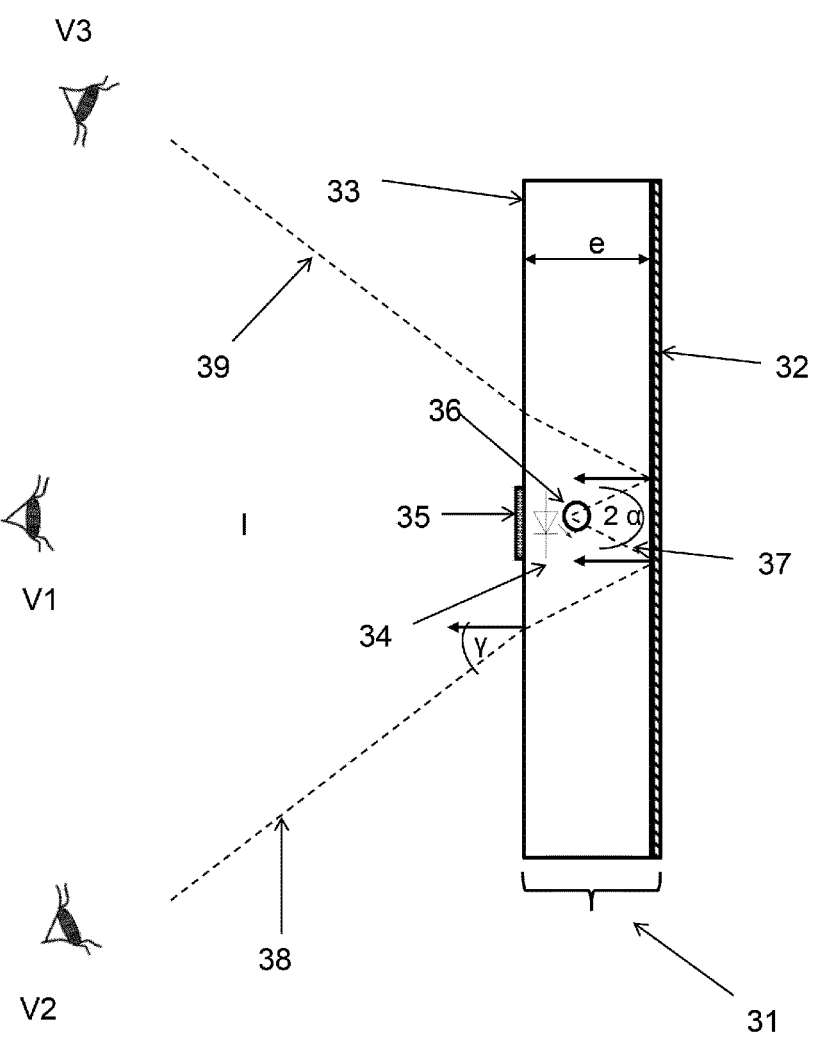
FIG. 3 shows a cross section of a front lighting system according to an embodiment of the present invention.

Diffuse reflection is the reflection of light from a surface such that an incident ray is reflected at many angles rather than at just one angle as in the case of specular reflection. An illuminated ideal diffuse reflecting surface will have equal luminance from all directions which lie in the half-space adjacent to the surface.

In front of refers to facing the display, i.e. in a position susceptible to be reached in a straight line by rays of light exiting the display. This is in a nominal/normal position to see images displayed by the display.

LCD. Liquid Crystal Display.

(O) LED. (Organic) Light Emitting Diode.

Range. The class of admissible values of a variable, in particular angular range will designate one or more intervals for an angle like e.g. the angle of incidence for a ray of light emitted.

Nominal. According to plan or expectations.

Specular reflection, also known as regular reflection is the mirror-like reflection of waves, such as light, from a surface. In this process, each incident ray is reflected, with the reflected ray having the same angle to the surface normal as the incident ray. The result is that an image reflected by the surface is reproduced in mirror-like (specular) fashion. The law of reflection states that for each incident ray the angle of incidence equals the angle of reflection, and the incident, normal, and reflected directions are coplanar.

Reflective pixel. One picture element of a spatial reflective light valve of the reflective display. In particular, a pixel of a liquid crystal display used in reflective mode.

VIA or via. Also known as vertical interconnect access. An electrical connection between layers in a physical electronic circuit that goes through the plane of one or more adjacent layers.

DETAILED DESCRIPTION OF THE INVENTION

Embodiment of the present invention relates to a method of making or operating a reflective display device as well as to a reflective display device itself, wherein the reflective display device comprises a spatial reflective light modulator or valve such as comprising an array or matrix of addressable reflective pixel elements, at least one light emitting element being positioned in front of the spatial reflective light modulator or valve such as comprising the reflective pixel elements. Embodiments of the present invention make use of the fact that the diffuse reflection component of the reflective display increases when the illumination direction gets closer to the perpendicular direction. Also the contrast improves the closer the illumination gets to the perpendicular direction. However, illumination rays close to the perpendicular direction need to be reduced in intensity or better still avoided to reduce the specular component. Embodiments of the present invention use illumination directions close to the perpendicular direction while preventing or reducing specular reflection within a range of incident angles. On the other hand embodiments of the present invention use an as large as possible range of incident angles for image formation.

Embodiments of the present invention can make use of the refraction of the glass plate for the specular reflected rays. When light rays exit the glass plate they are bent through an angle due to the difference in refractive index between glass and air. For instance a ray at 30 degrees to the perpendicular inside the glass will result in an angle of 48 degrees in air. So the usable angular range which avoids or reduces the specular component is larger in air than in glass. Alternatively, for a viewing angle of 35 degrees to the normal, rays inside the glass would be at an angle of 22 degrees to the normal.

The restriction on ray directions results in conical shape if the rays are symmetrical about the normal. Embodiments of the present invention can have the range which excludes the specular component, being not conical. This is an advantage if the reflective display is mounted on a wall. Typically in a vertical direction there will be less range of incident angles required to use for illumination, compared to the horizontal direction. Specular images of the LEDs will be seen only when the head of a person is very close to the floor or to the ceiling.

FIG. 3 shows a cross section of an example of font lit display according to an embodiment of the present invention.

A reflective display 31 comprises a spatial reflective light modulator or valve such as comprising an array or matrix 32 of reflective pixel elements. The spatial reflective light modulator or valve such as comprising the array or matrix 32 of reflective pixel elements is lit by light emitting diodes 34 positioned in front of the spatial reflective light modulator or valve such as comprising the matrix 32 of reflective pixel elements. A transparent layer 33 is in contact with the spatial reflective light modulator or valve such as comprising the matrix of reflective pixel elements. The transparent layer 33 protects the spatial reflective light modulator or valve such as comprising the matrix of reflective pixel elements and/or helps to make the distribution of light across the spatial reflective light modulator or valve such as comprising the matrix of reflective pixel elements more uniform. The transparent layer 33 has a first surface and a second surface. The second surface is closer to the spatial reflective light modulator or valve such as comprising the matrix 32 of reflective pixel elements than the first surface. The transparent layer 33 may contain diffusing particles in its bulk or on its first surface. The thickness e of the transparent layer 3 can vary in function of the required uniformity of the lighting on the spatial reflective light modulator or valve such as comprising the matrix 32 of reflective pixel elements.

A mask or mirror 35 prevents light emitted by a LED 34 from reaching a viewer V1 without first having been reflected from the spatial reflective light modulator or valve such as comprising the matrix 32 of reflective pixel elements.

Light shaping means 36 distribute the light emitted by LED 34 unevenly. The light shaping means 36 can for instance (e.g. in some embodiments) exclude ray of lights emitted by the LED 34 to reach a specific region of the spatial reflective light modulator or valve such as comprising the matrix 32 of reflective pixel elements in a straight line (i.e. without first having been diffused or reflected). The light shaping means 36 prevent rays of light emitted by the LED 34 to reach the spatial reflective light modulator or valve such as comprising the reflective pixel elements with an angle of incidence in a determined range. In the example of FIG. 3, the light shaping means 36 prevent light rays emitted by the LED 34 to propagate within a cone 37 between the LED 34 and the spatial reflective light modulator or valve such as comprising the matrix 32 of reflective pixel elements.

The cone 37 has an opening angle 2a. The rays of light emitted by LED 34 outside of cone 37 impinge on the matrix 32 of reflective pixel with an incident angle β which is always larger than α. Specular reflection by a reflective pixel of the matrix 32 of the rays emitted by LED 34 will thus always be at an angle of reflection larger than α. The angle γ with which the rays of light undergoing specular reflection (like e.g. ray 38 and 39) exit layer 33 will be even larger.

Figure 4:
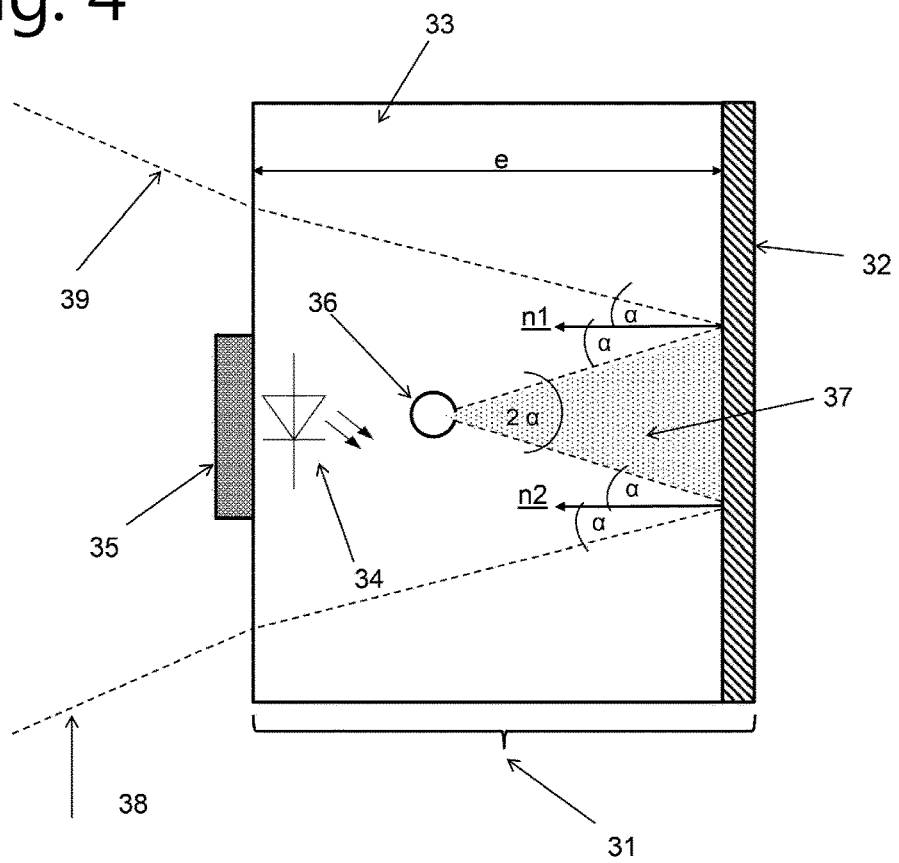
FIG. 4 shows a cross section of a front lighting system according to an embodiment of the present invention.

FIG. 4 shows a magnification of FIG. 3 in the transparent region 33 between the LED 34 and the spatial reflective light modulator or valve such as comprising the matrix 32 of reflexive pixel elements.

The vectors n1 and n2 are normal to the second surface of the layer 33 and the spatial reflective light modulator or valve such as comprising the matrix 32 of reflective pixel elements.

It is a purpose of embodiments of the present invention to deal with the specular reflection of light generated within a display device and directed towards the spatial reflective light modulator or valve such as comprising the reflective pixel elements of the display device.

The only rays of light that can exit the transparent layer 33 within the cone delimited by the rays of light 38 and 39 (region I on FIG. 3) have been reflected diffusively by the spatial reflective light modulator or valve such as comprising the reflective pixel elements of matrix 32. Having been reflected diffusively, they will not form an image of the LED 34 on the retina of a viewer and therefore will not be perceived by the viewer V1 as a hot spot on the display.

Figure 5:
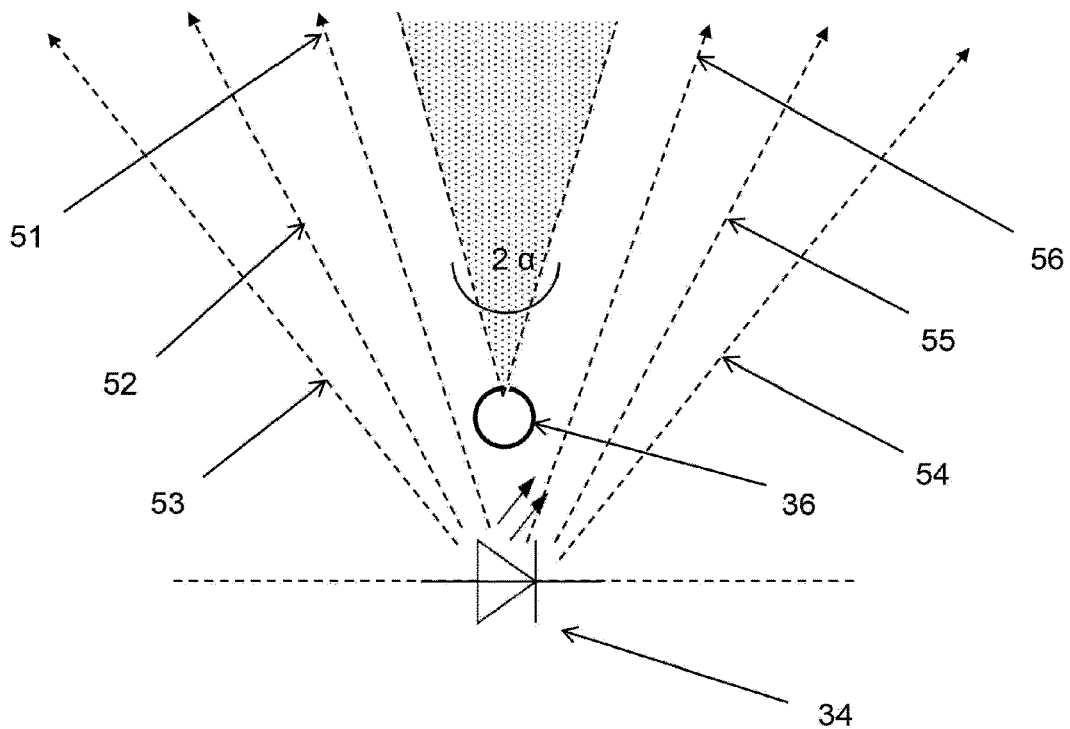
FIG. 5 shows the effect of light shaping means on the angular distribution of light emitted by a light emitting element of an example of front lighting system according to an embodiment of the present invention.

The light shaping means 36 direct the light generated by the light source 34 in preferred directions. The preferred directions exclude one or more intervals of angle of incidence on the spatial reflective light modulator or valve such as comprising the reflective pixel elements of the matrix 32. FIG. 5 shows the preferred directions for the light emitted by the LED 34 and shaped by the light shaping means 36 corresponding to the example of FIGS. 3 and 4. The light shaping means 36 prevent light emitted by the diode 34 to enter a cone 37 (dotted region) without first having been reflected and/or diffused by a reflective pixel and/or e.g. by diffusing particles in the transparent layer 33. A ray of light emitted by the LED 34 and propagating outside of the cone 37 will hit a reflective pixel of the display with an angle of incidence larger than α. For instance a ray of light like 51, 52, 53, 54, 55 or 56 is emitted by the LED 34 and propagates throughout the transparent layer 33 before reaching a reflective pixel with an angle of incidence β>α. The angle of incidence β is determined as is the convention between the incident ray of light 55 and the normal n2 to the surface of matrix 2 at the point of incidence.

Figure 6A:
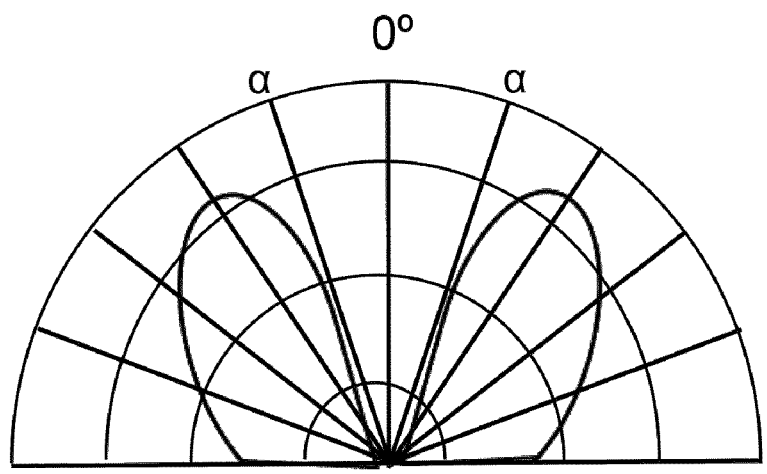
FIG. 6A shows the angular distribution of light for a LED.
Figure 6B:
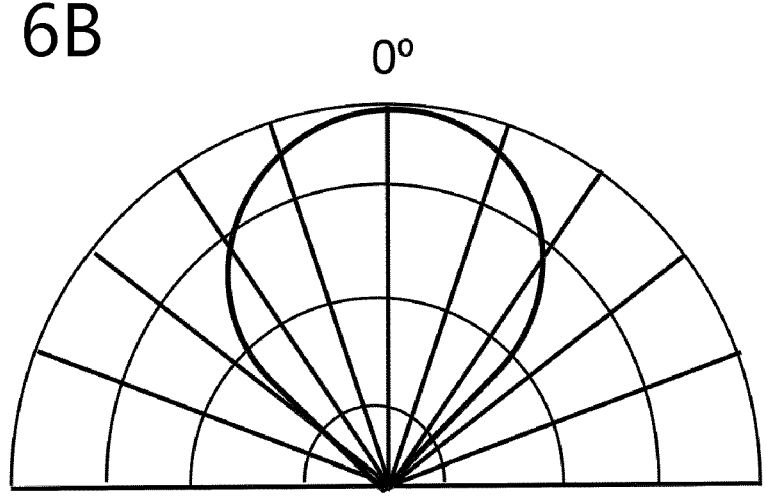
FIG. 6B shows the angular distribution of the LED modulated by the light shaping means.

FIG. 6A shows the intensity of the light radiated by the LED 34 in function of the angle under which the ray of light is emitted by the LED. FIG. 6B shows the same when the LED 34 is combined with the light shaping means 36. In this example, the optical axis of the LED (corresponding to 0°) is perpendicular to the plane within which the spatial reflective light modulator or valve such as comprising the reflective pixel elements lie, and the angle also corresponds to the angle of incidence with which a ray of light emitted by the LED 34 and propagating in straight line through the transparent layer 33 will hit a reflective pixel element. Part of the light undergoes specular reflection on the reflective pixel element(s). The angle of incidence being larger than α, specular reflection on a pixel element of matrix 32 of a ray of light emitted by LED 34 and propagating in straight line from LED 34 will always be done with a reflection angle larger than α.

Figure 7:
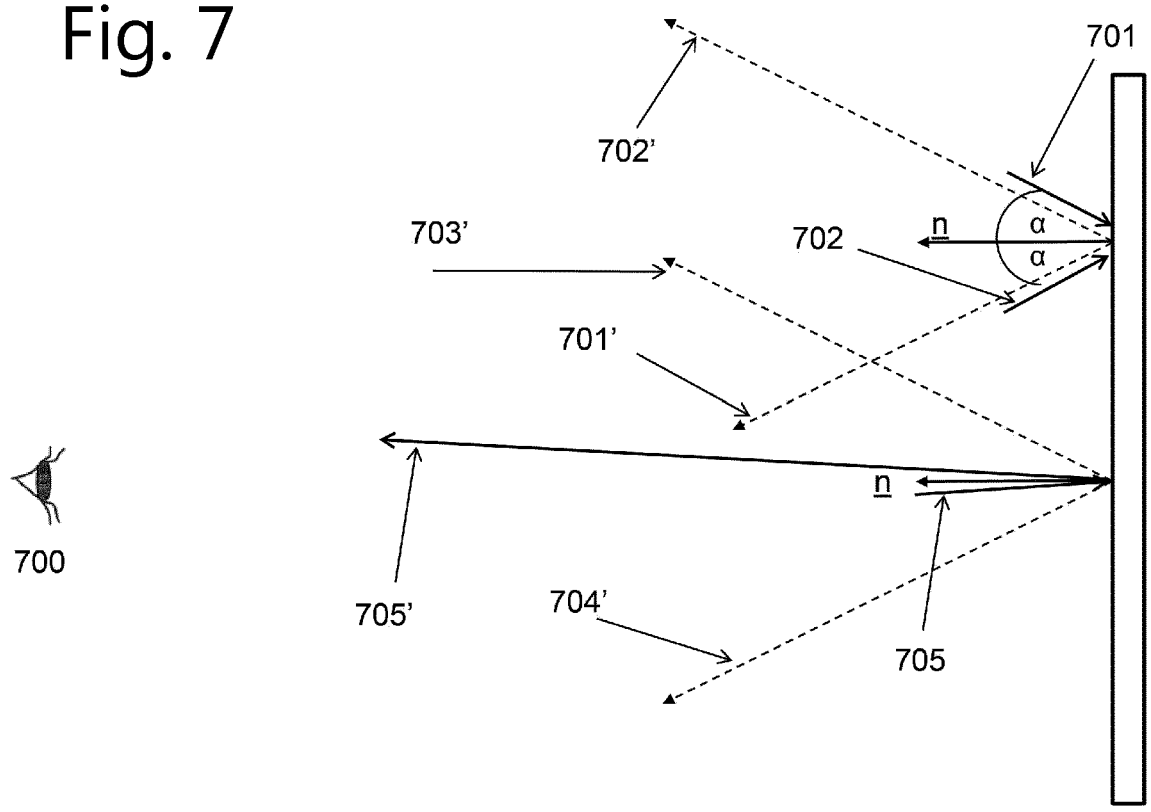
FIG. 7 shows the distribution of rays of light able to form a specular image of the light emitting element without light shaping means.

FIG. 7 shows a number of light rays that underwent specular reflection on the spatial reflective light modulator or valve such as comprising the reflective pixel elements. The light rays exit the first surface of the transparent layer 33 at an angle that varies in function of the angle of incidence. FIG. 7 shows the result when there is no light shaping means.

The light rays 701', 702', 703' and 704' corresponds to the rays of light 701, 702, 703, 704 that underwent specular reflection on a reflective pixel with an angle of incidence equal to α. Light ray 705' corresponds to a light ray 705 that underwent specular reflection on a reflective pixel with an angle of incidence smaller than α. Light rays 701, 702, 703, 704 and 705 propagated in straight line between the light source 34 and the spatial reflective light modulator or valve such as comprising the matrix of reflective pixel elements. For a viewer 700 looking straight at the display, the light ray 705' will be visible. The light ray 705 and other light rays in its vicinity will form an image of the LED 34 on the retina of the viewer. This is not desirable.

Figure 8:
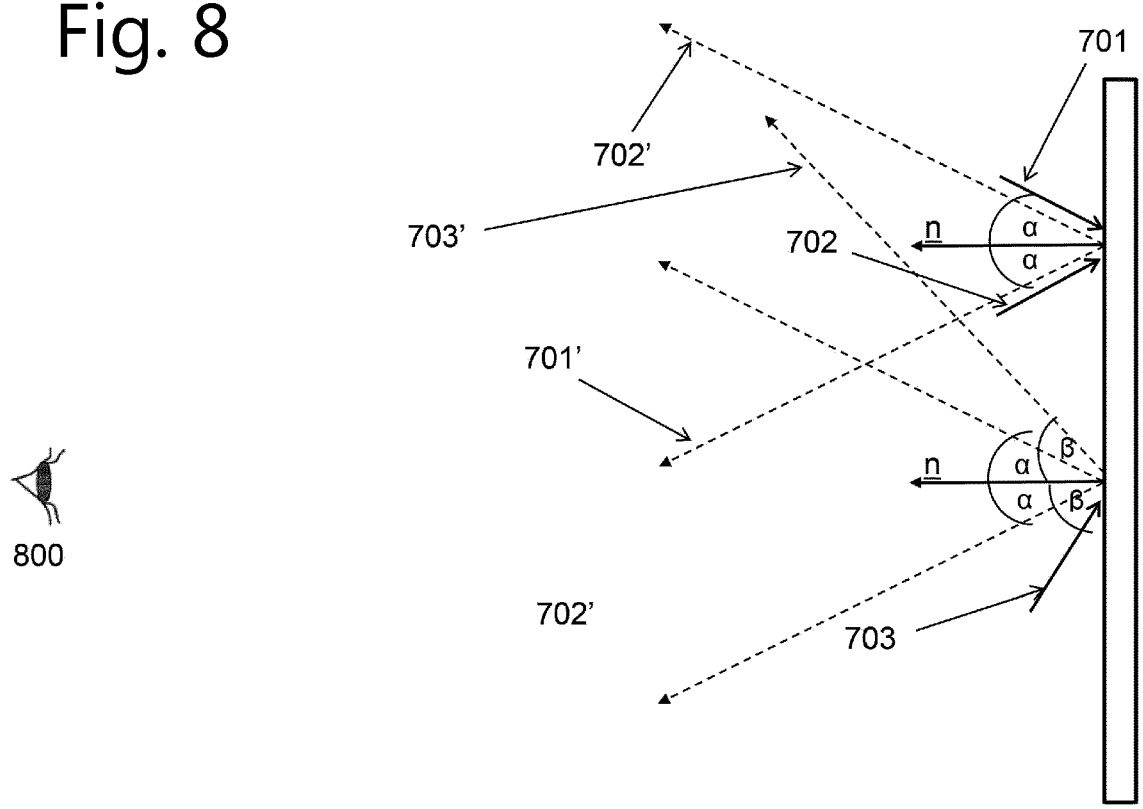
FIG. 8 shows the distribution of rays of light able to form a specular image of the light emitting element with light shaping means.

In contrast thereto, FIG. 8 shows the angular distribution with which light rays that underwent specular reflection on the spatial reflective light modulator or valve such as comprising the reflective pixel elements exit the first surface of the transparent layer 33 in function of the angle of incidence when there are light shaping means 36. No ray of light will be reflected under an angle smaller than alpha, the rays of light undergoing specular reflection on a reflective pixel element or elements will all be outside of a cone C with an opening angle of 2α. If alpha is taken large enough (e.g. α>25 degrees of angle), a viewer 800 looking straight at the display, will see no specular reflection of the light emitting element 34. The cone C thus determines a region of space within which no specular image of the light emitting element will be visible or the specular image will be weakened.

Figure 9A:
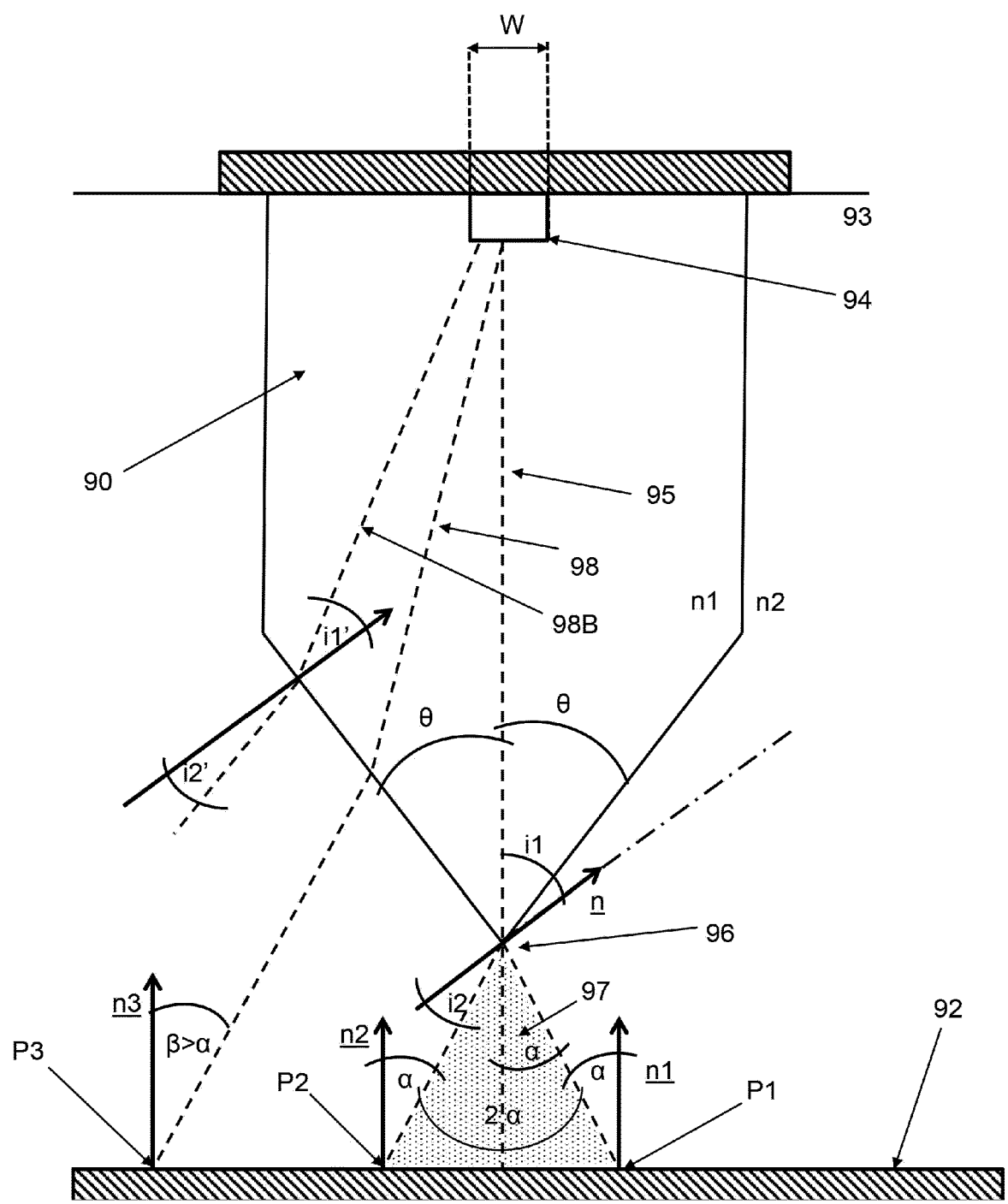
FIG. 9A is a cross section of light shaping means using refraction to shape the light distribution.
Figure 9B:
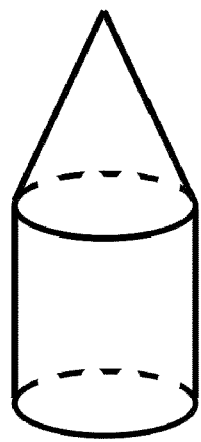
FIGS. 9B, 9C, 9D and 9E show perspective views of different geometries that can be used for the cavity of a refractive light shaping means.
Figure 9C:
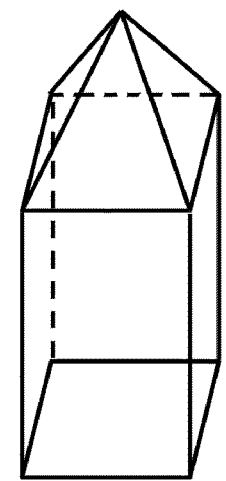
Figure 9D:
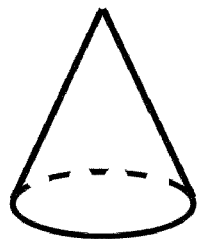
Figure 9E:
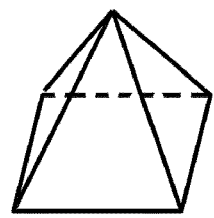

For the sake of simplicity, we have considered a transparent layer 33 with the same index of refraction as the medium (e.g. air) in which a viewer looks at the display on both FIGS. 7 and 8. The light shaping means can be made of a refractive medium. An example of refractive light shaping means can be seen in FIG. 9A. A light emitting element like e.g. a LED 94 is positioned within a cavity 90 in the transparent layer 93. The cavity can be e.g. pencil or cone shaped (see for example the cross section of the cavity on FIG. 9A). The cavity is filled with a medium with an index of refraction smaller than the index of refraction of the transparent layer 93. In FIG. 9A, the light emitting diode is assumed to be a point of light. This is not an unrealistic hypothesis for a LED which is typically 100 μm×200 μm and the cavity has width or radius W in the range 1 to 2 mm or more.

The geometry of the cavity is chosen in function of the range of angle of incidence that must be avoided. The example of FIG. 9A corresponds to e.g. FIG. 3, FIG. 4, FIG. 5 and FIG. 6B.

The cavity 90 is usually filled with air or preferably an inert gas like nitrogen and n1 is equal to 1 within a few percent.

The angle α is determined by the angle θ and the index of refraction n1 of the medium inside the cavity 90 and the index of refraction n2 of the transparent layer 93.

Indeed, as can be seen on FIG. 9A:

$$i1 = \frac{1}{2}\pi - \theta \quad (1)$$

where i1 is the angle of incidence of a ray of light 95 incident on the interface between the cavity 90 and the transparent layer close to the tip 95 of the cone or pencil shaped cavity; (½πradians=90°).

$$\alpha = \theta - i2 \quad (2)$$

where i2 is the refraction angle that the ray of light 95 as it enters the transparent medium 93 where i2 and i1 are linked by the law of Snell-Descartes $$\sin i2 = n1/n2 \sin i1 \quad (3)$$

In the example of FIG. 9A, the cone 37 of FIG. 3 (97 on FIG. 9A) has its apex coinciding with the tip 96 of the cone or pencil shaped cavity 90.

The light shaping means thus direct the light emitted by LED 94 in preferred directions that correspond to an angle of incidence on a reflective pixel in the interval [α, π/2]. As seen on FIG. 9A, a ray of light like 98 or 98B will be incident on the matrix 92 of reflective pixel with an angle β larger than α. On FIG. 9A, n1, n2 and n3 are vectors normal to the spatial reflective light modulator or valve such as comprising the matrix 92 of reflective pixel elements at points of incidence P1, P2 and P3 respectively. The light shaping means prevent that a ray of light emitted by LED 94 and propagating in a straight line throughout the transparent medium from reaching a reflective pixel with an angle of incidence in the interval [0, α]. The sole ray of light that can reach a reflective pixel with an angle of incidence in the interval [0, α] have first been diffused in the transparent layer. Since they have been diffused, they will not contribute to a specular image of a LED.

Rays of light that arrive on the spatial reflective light modulator or valve such as comprising the matrix of reflexive pixel elements with too large an angle of incidence do not contribute much to the lighting. To increase the efficiency of the lighting, the light shaping means should at the same time exclude angles of incidence smaller than α and redirect them as much as possible in the interval [α, α+Δα]

where α+Δα is a lot smaller than π/2. For instance, the rays of light are concentrated in an interval [5°, 15°].

A potential problem of the refractive light shaping means of FIG. 9A is the manufacturability of the cavity 90 and in particular the tip 96 of the cone of pencil shaped cavity. Due to tolerances, the tip may be rounded. This may result in some rays of light entering the transparent medium 93 close to the tip 96 to be incident on the spatial reflective light modulator or valve such as comprising the matrix 92 of reflective pixel elements with an angle of incidence smaller than α. This may result in a low intensity specular image of the light source 94 reaching a viewer even in region I of FIG. 3. This problem can be avoided with different geometries for the light shaping means and/or by the use of reflective surfaces as in the next example of embodiment.

Examples of possible geometries for the cavity 90 are given on FIGS. 9B, 9C, 9D and 9E. Other geometries are possible like e.g. an obelisk shaped cavity.

The light shaping means can use a reflective surface.

Figure 10:
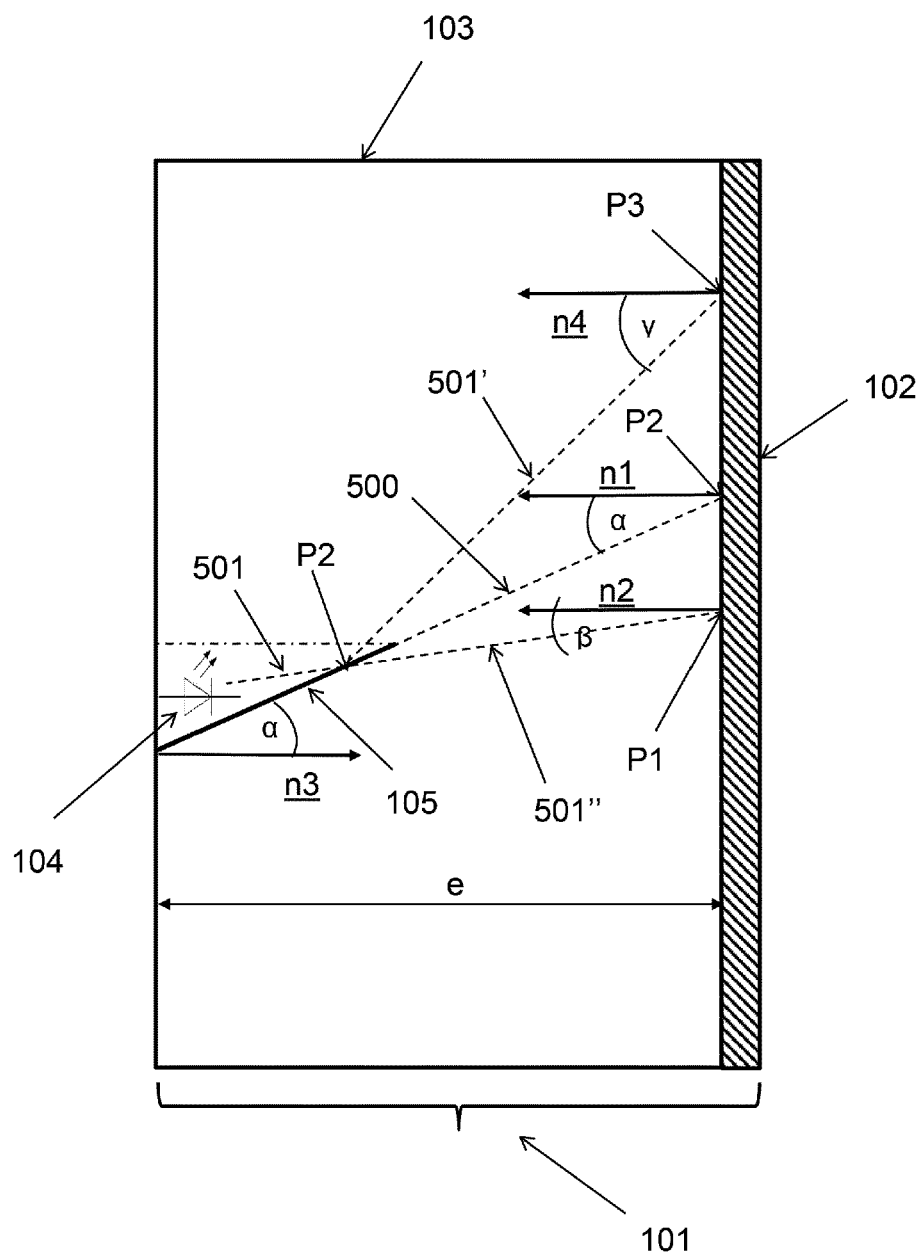
FIG. 10 is a cross section of an example of display according to an embodiment of the present invention when the light shaping means use reflection to shape the light distribution.

For instance, FIG. 10 gives an example of reflective light shaping means. The LED 104 is coupled with a reflective surface 105. The surface 105 is reflective on one side only (the side directly facing the diode 104). The back of surface 105 is e.g. coated with a layer that absorbs light.

The surface 105 makes an angle α with a normal n3 to the first surface of the transparent layer 103.

A ray of light like e.g. 500 emitted by LED 104 and forming an angle equal to or larger than α with the normal n3 to the first surface of the transparent layer 103 will propagate in a straight line and reach the spatial reflective light modulator or valve such as comprising the matrix 102 of reflective pixel elements with an angle of incidence equal to or larger than α at point P2 (note: for the sake of clarity, we consider that the angle of incidence of a ray of light at the second surface of the transparent layer 3 is equal to the angle of incidence of that ray of light on the spatial reflective light modulator or valve such as comprising the matrix of reflective pixel elements. This is the case if e.g. there is no intermediate layer between the second surface of layer 103 and the surface of the spatial reflective light modulator or valve such as comprising the matrix 102 as will be described later).

A ray of light like e.g. 501 emitted by LED 104; and forming an angle smaller than α with the normal n3 to the first surface of the transparent layer 103; will be reflected by the reflective surface 105. The reflected ray 501' will reach the spatial reflective light modulator or valve such as comprising the matrix 102 of reflective pixel elements at point P3 with an angle of incidence γ larger than alpha at point. Without the reflective surface 105, the ray of light 501 would have continued along a straight line 501" and reached the spatial reflective light modulator or valve such as comprising the matrix 102 of reflective pixel elements at point P1 with an angle of incidence β smaller than α. On FIG. 10, the prolongation 501" of the ray of light has been indicated. 501" corresponds to the trajectory of the ray of light 501 in absence of reflective surface 105. 501" intersects the matrix 102 at point P1 with an angle of incidence (angle between 501" and the normal n2 to the surface of 102 at point P1) smaller than α.

As was the case in the previous example, the light shaping means thus direct the light emitted by LED 104 in preferred directions that correspond to an angle of incidence on a reflective pixel in the interval [α, π/2].

We will now describe in greater detail how to manufacture a display according to the principles of the invention.

In a first step, a printer circuit board is etched. The printed circuit board 111 has a first surface 111A (a front face, illustrated on FIG. 11A) and a second surface 111B (a back face, illustrated on FIG. 11B).

The material of the printed circuit board is e.g. epoxy resin with a thickness of 0.1 to 0.25 mm. The Light Emitting Diode 112 can be available as a surface mountable device to be soldered to pads 113A and 113B on the front face 11A. The light emitting diodes can be a bare chip to be glued between pads 113A and 113B and wire bonded to pads 113A and 113B.

The pads 113A and 113B are connected to pads 116A and 116B on the back face 111B by way of vias 114A, 114B, 115A and 115B. The vias are positioned around the LED 112. A via is shared by several LEDs until the PCB is sawed (along the dotted lines). The vias can be closed from either the back side or the front side. The vias can be filled (a silver-based epoxy inserted), capped (Copper layers cover the filler), plugged (a blob of solder mask is applied to the via, creating a slight bump), tented (a plain solder mask film covers the via, often slightly concave).

Figure 11A:
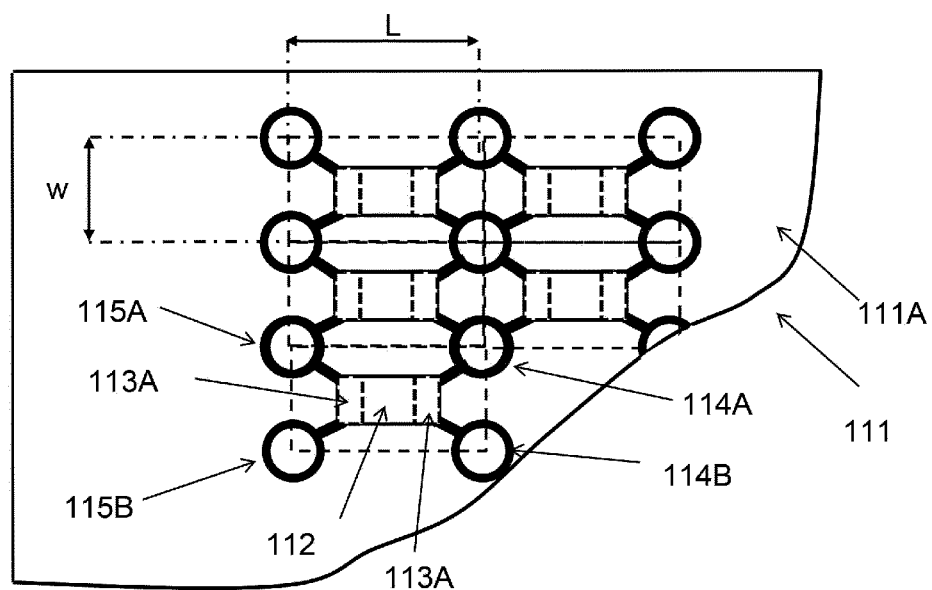
FIG. 11A represents a first side (front side) of a printed circuit board according to an example of an embodiment of the present invention.
Figure 11B:
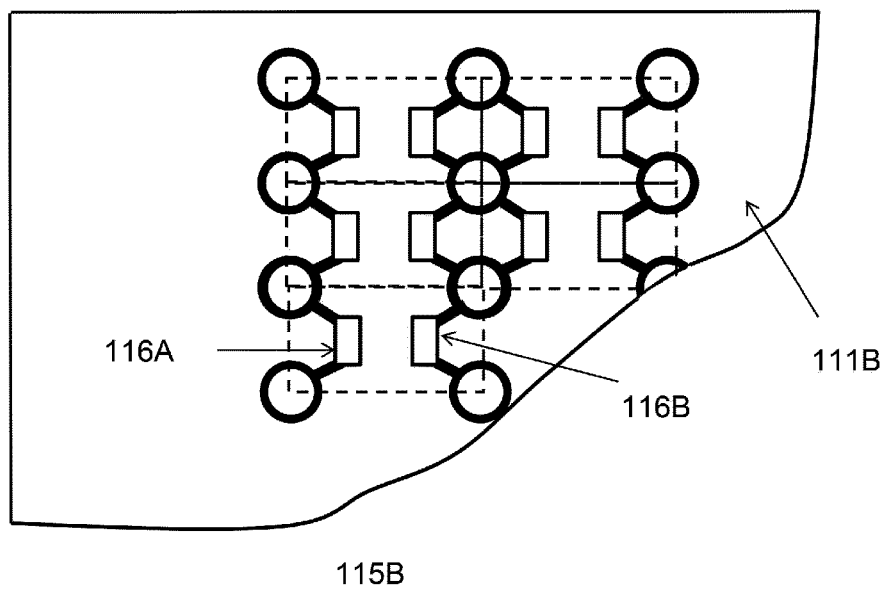
FIG. 11B represents a second side (back side) of a printed circuit board according to an example of an embodiment of the present invention.
Figure 12A:
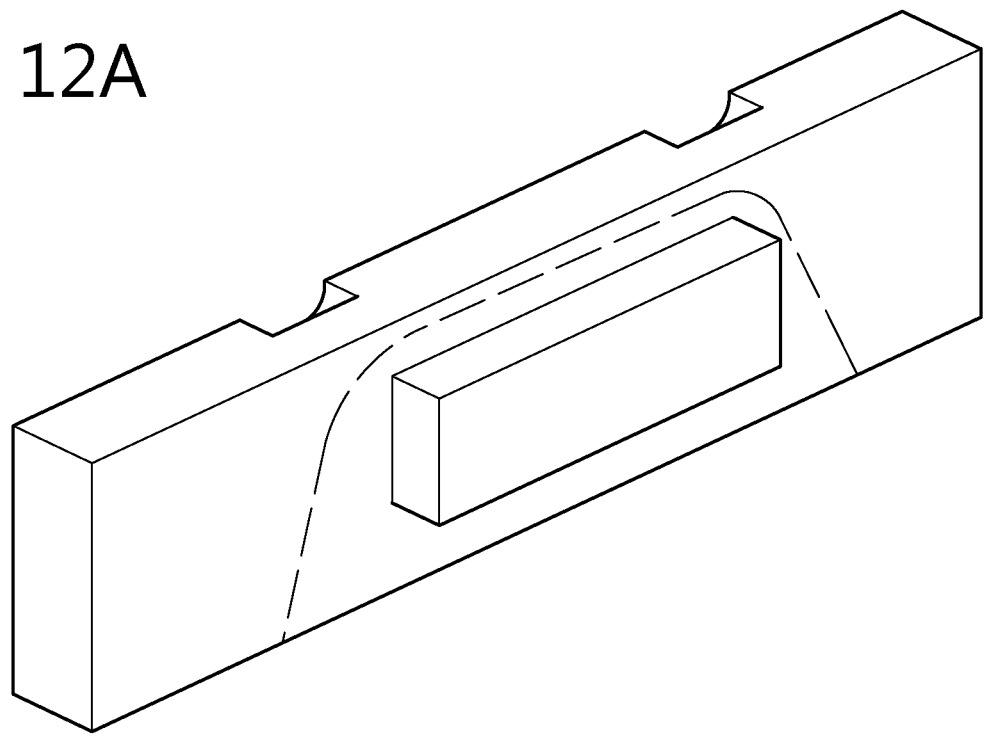
FIG. 12A represents a perspective view of a LED mounted on the front side of a sawed printed circuit board according to an example of an embodiment of the present invention.
Figure 12B:
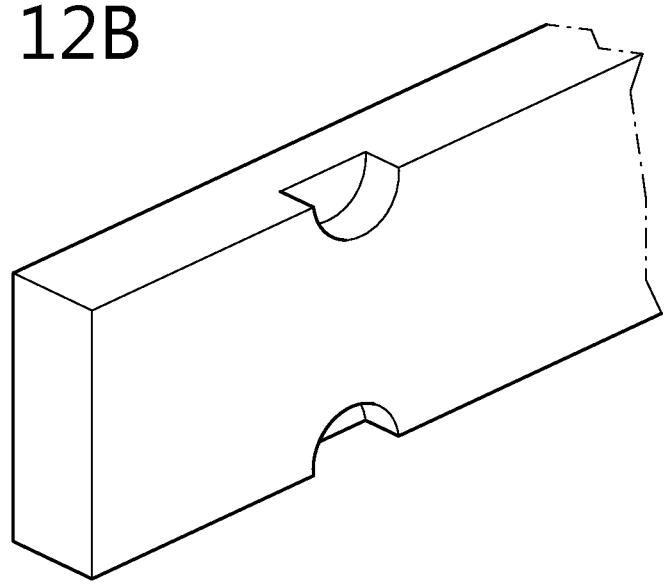
FIG. 12B represents a perspective view of a backside of a sawed printed circuit board according to an example of an embodiment of the present invention.

FIGS. 12A and 12B shows a perspective view of a LED mounted on a printed circuit board after it has been sawed off (along the dotted lines on FIGS. 11A and 11B).

Figure 13:
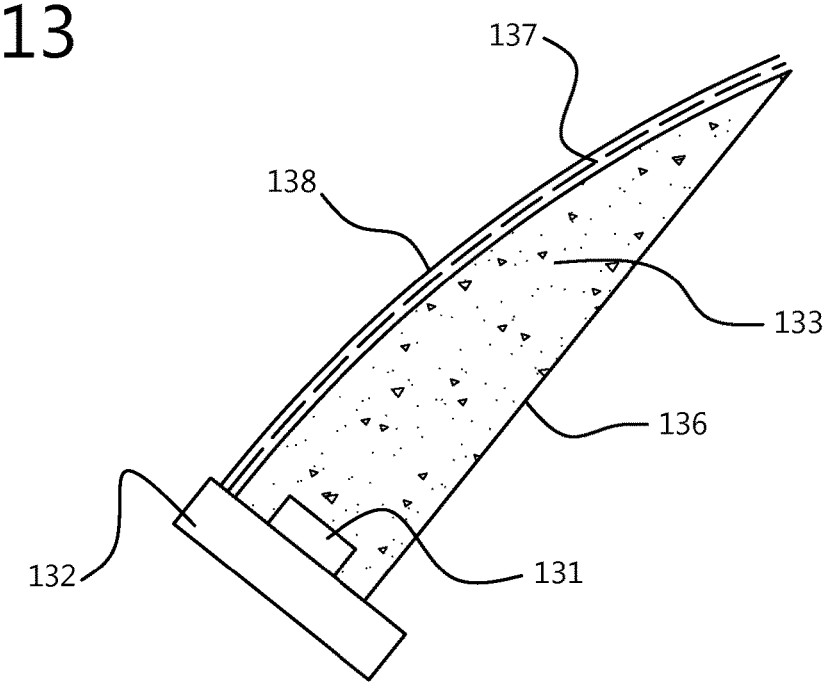
FIG. 13 shows a cross section of a LED encapsulated according to an example of an embodiment of the present invention.

FIG. 13 shows a cross section of a LED 131 mounted on a printed circuit board 132. The LED is enclosed in a transparent material 133 identical or close to the material used for the transparent layer 33 of the display. The transparent material is e.g. an optical silicone resin. The transparent material is delimited by a surface 134. A first part 135 of the surface 134 is reflective and reflects light emitted by the LED 131 towards a second part 136 of the surface 134. The reflective surface 135 corresponds to e.g. surface 55 on FIG. 10.

Figure 14:
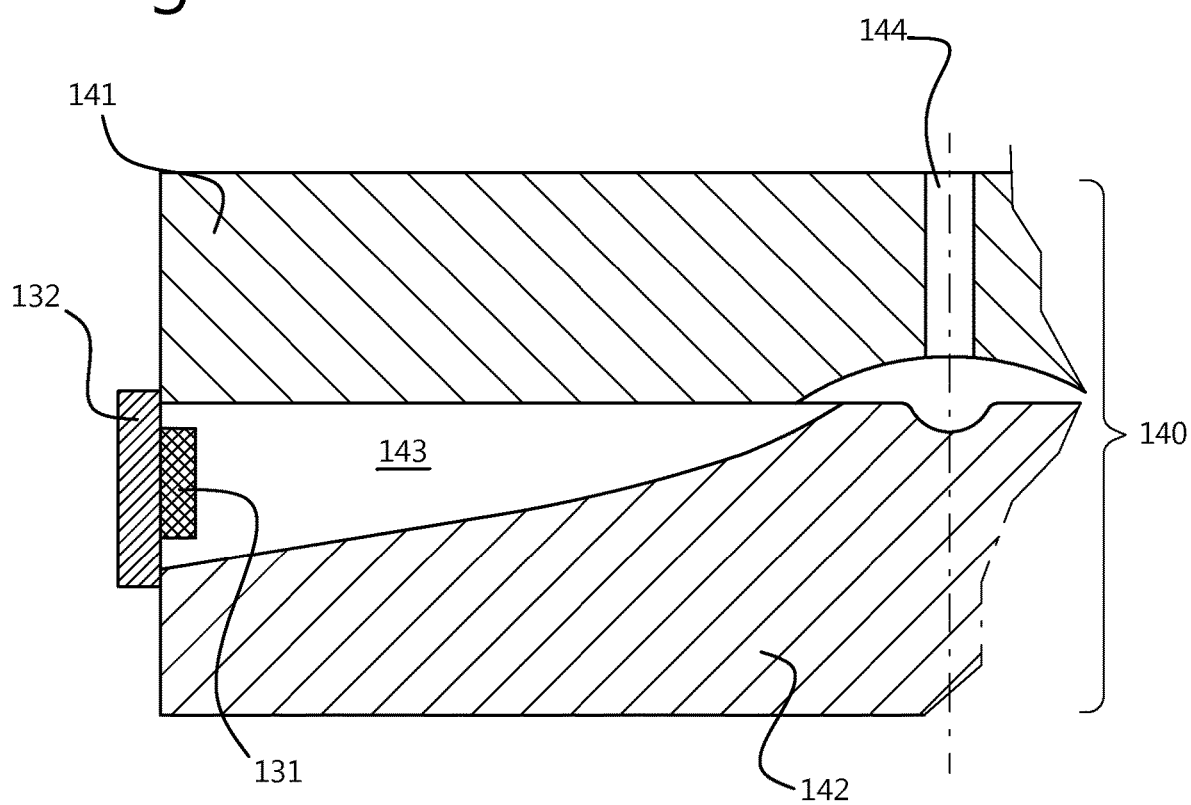
FIG. 14 shows an example of mold that can be used to encapsulate a LED in optical silicone resin.

FIG. 14 illustrates how the LED can be enclosed in transparent material.

The printed circuit board can be sawed to match the number of LEDs to the number of cavities in the mold.

The LED 131 and the printed circuit board 132 are positioned in a mold 140. The mold can comprise two parts 141 and 142 as shown on the example of FIG. 14.

The two parts define a cavity 143 that can be filled by e.g. a moldable optical silicone resin like Dow Corning® MS-1002 Moldable Silicone. The cavity 143 can be filled through e.g. channel 144.

A reference hole 145 in the printed circuit board can be used to position the printed circuit board against a first part 141 of the mold 140. A pin 146 on the first part 141 of the mold 140 corresponds to the reference hole 145 of the printed circuit board. Once the printed circuit board is in position, the second part 142 of the mold is positioned against the first part. Once the first part and second part of the mold have been assembled, the moldable silicone can be introduced in the cavities 143 through an opening in the second part 142 of the mold 140.

Figure 15A:
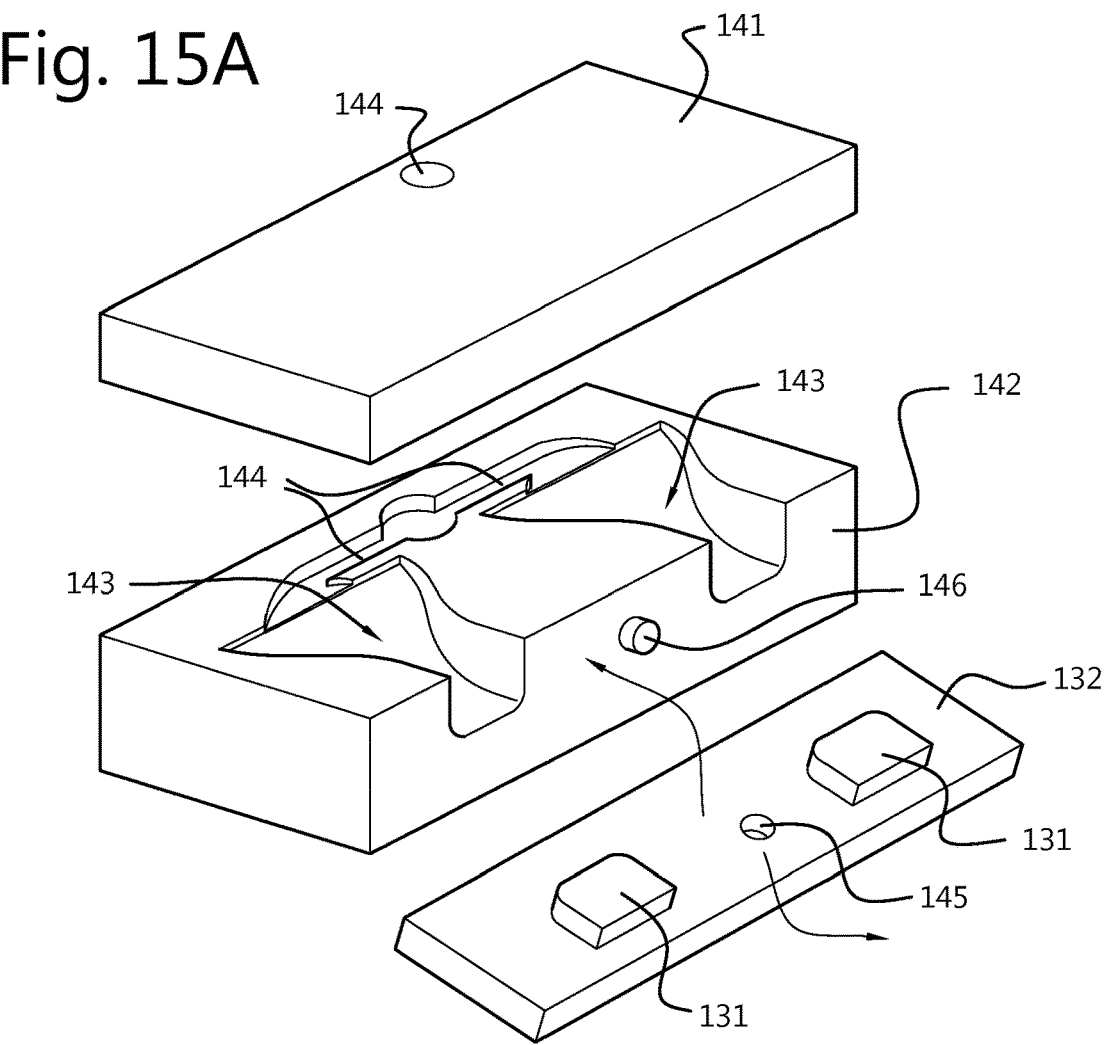
FIG. 15 shows a perspective view of a mold that can be used to encapsulate two LEDs at the same time in optical silicone resin.
Figure 15B:
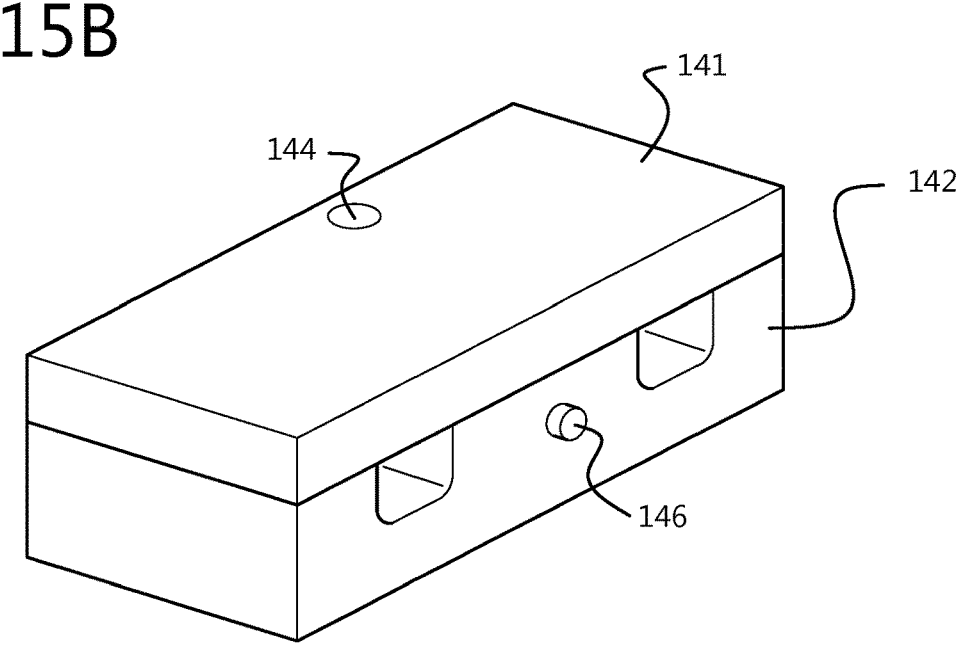

FIG. 15 shows a perspective view of a double mold that can be used to enclose two diodes at a time in transparent material. The printed circuit board accommodates two LED and can be sawed in two after the LED have been enclosed. Once the optical silicone resin has hardened, a reflective coating is applied to the first part 135 of the surface 134 of the hardened silicone resin.

A surface treatment may be necessary before applying a reflective coating and/or a "primer" can be needed on the hardened silicone before the reflective coating can be applied.

Cracks can develop in the reflective coating. To prevent light from propagating through the cracks, a second coating 138 in a light absorbing material is formed on the reflective coating. The second coating can e.g. be a mat black (adhesive) tape. Any material that absorbs light and that can deform without cracking when the transparent material 133 deforms and can form a layer on the first part 135 of the surface 134 can be used.

Figure 16:
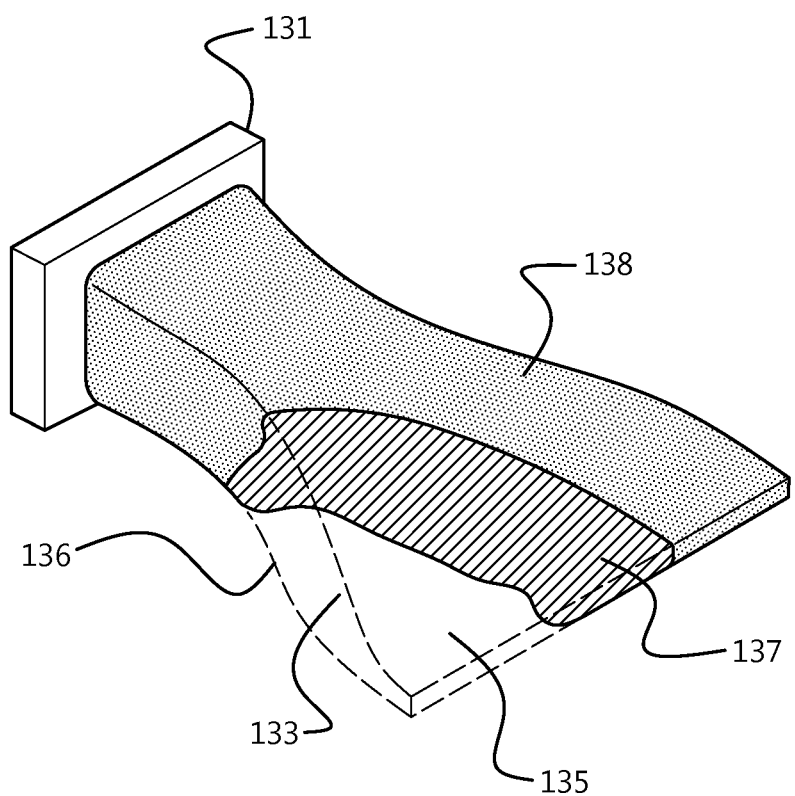
FIG. 16 shows a perspective view of a LED encapsulated in optical silicone resin according to an example of an embodiment of the present invention.

FIG. 16 shows a perspective view of a LED enclosed in optical silicone resin with the different coating layers: a reflective coating 137 covers a first part 135 of the surface 134 delimiting the optical silicone resin. An absorbing layer 138 covers the reflective coating 137 and absorbs light that would propagate through cracks in the coating 137.

Figure 17:
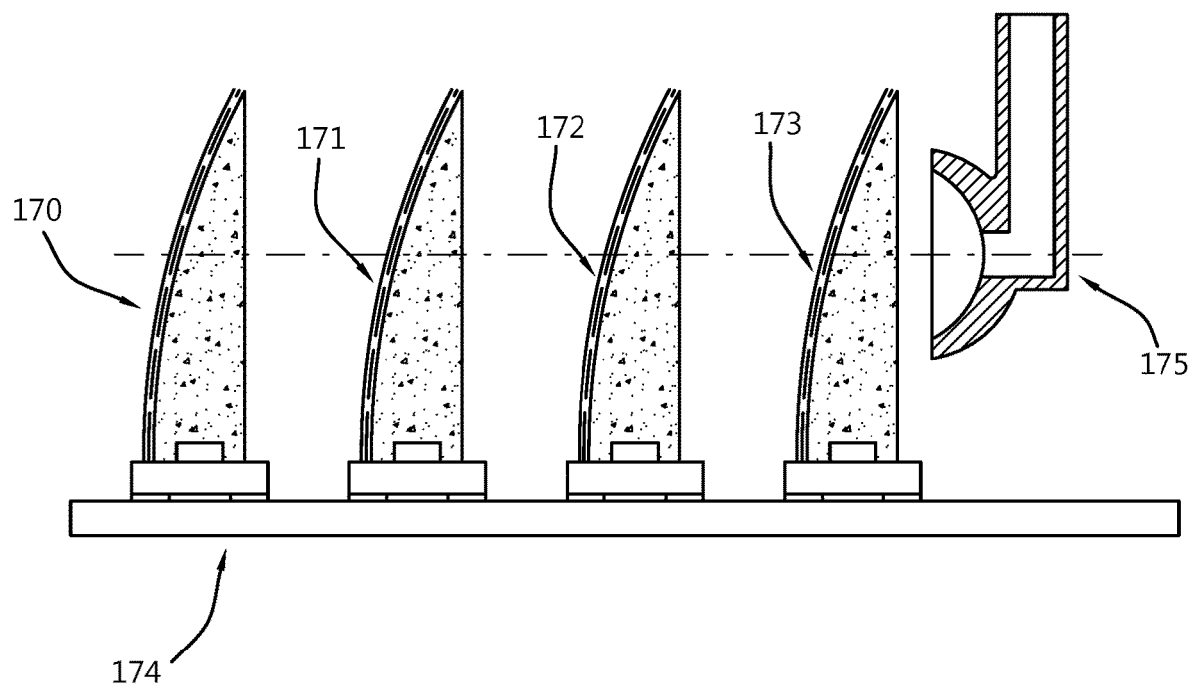
FIG. 17 shows encapsulated LEDs on an adhesive support from which they can be picked-up for assembly of a display device according to an example of an embodiment of the present invention.

In a next step, as illustrated on FIG. 17, enclosed LED 171, 172, 173 . . . can be positioned on a slightly adhesive support 174 like e.g. dicing tape. The back face of the printed circuit board is in contact with the adhesive support 174. The enclosed LEDs (i.e. lighting elements) can be manipulated with a vacuum suction cup 175. In the example of FIG. 17, the surface used to grab a lighting element with the suction cup is perpendicular to the surface of the adhesive support 174. In the example of FIG. 17, the second part 136 of the surface 134 delimiting the hardened silicone resin can be used.

Figure 18:
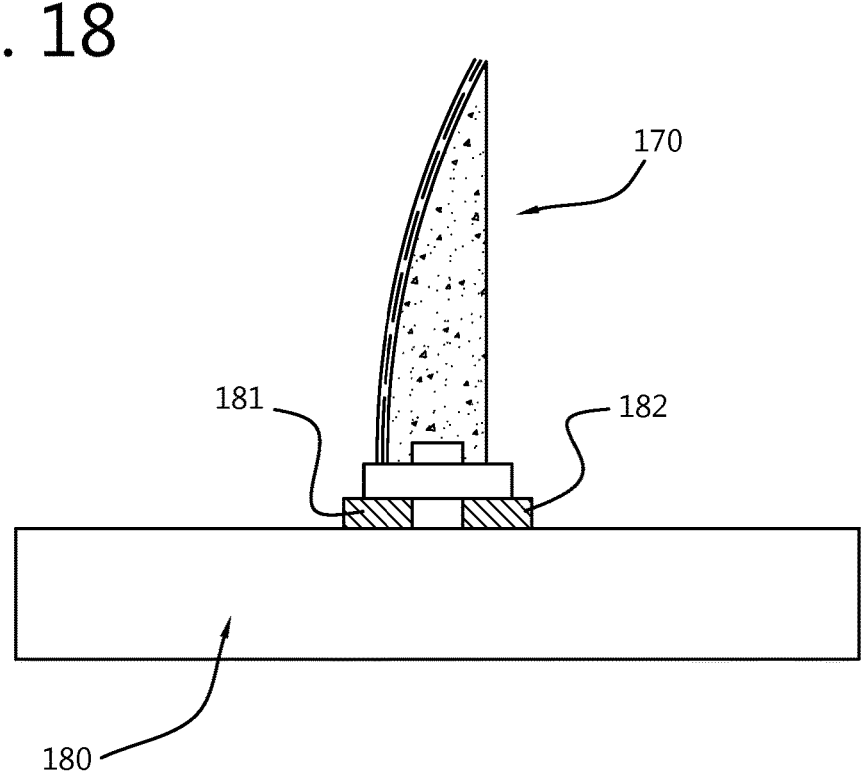
FIG. 18 shows an encapsulated LED positioned on a glass substrate before formation of a transparent layer of the display according to an example of embodiment of the present invention.

In a next step, the lighting elements like 170 are positioned on a transparent substrate 180 (like e.g. a glass substrate) on which ITO electrodes 181, 182 . . . have been formed as shown in FIG. 18. The pads 116A and 116B on the back side of the printed circuit board contact the ITO electrodes.

Once the desired number of lighting elements has been positioned on the glass substrate; the transparent layer 33 of the display is formed. The transparent layer 33 can be made of the same moldable silicone resin as the material used to encapsulate the LED in the previous step.

Figure 19A:
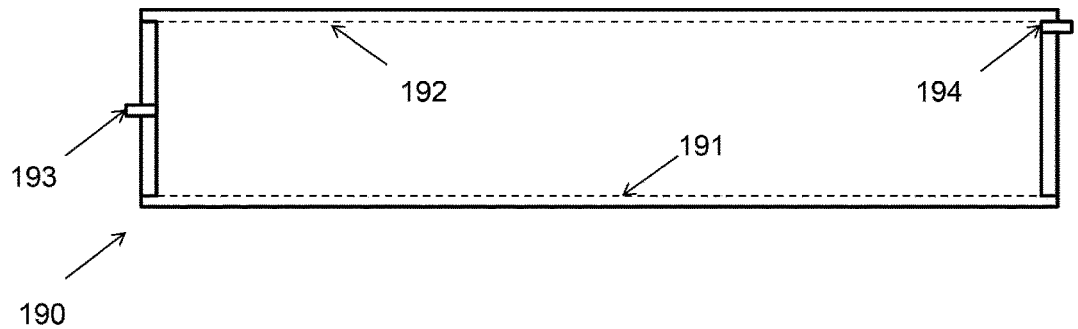
FIG. 19A shows a schematic cross section of a mold according to an example of an embodiment of the present invention.

FIG. 19A shows a mold 190 with a first opening 191 to receive the transparent substrate 180 and a second opening 192 to receive a spatial reflective light modulator or valve such as comprising a matrix of reflective pixel elements.

The mold 190 also has opening 193 through which optical silicone can be forced and opening 194 to let gas escape.

Figure 19B:
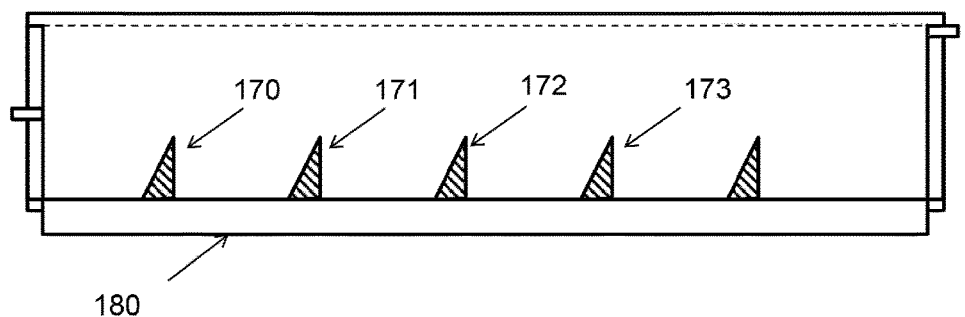
FIG. 19B shows a schematic cross section of the mold with a glass substrate and encapsulated LED.

FIG. 19B shows the mold with the glass substrate 180 and lighting elements (170, 171, 172, 173) in position.

Figure 20A:
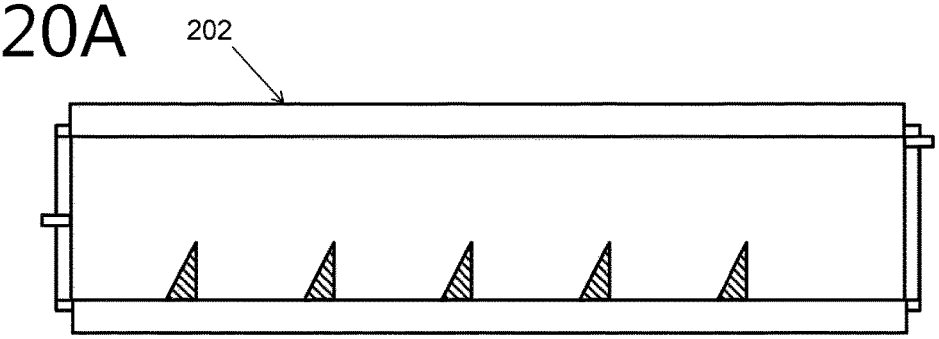
FIG. 20A shows a schematic cross section of the mold with a glass substrate and encapsulated LED and the matrix of reflective pixel elements in position.

FIG. 20A shows the mold with the spatial reflective light modulator or valve such as comprising the matrix 202 of reflective pixel elements in position.

Figure 20B:
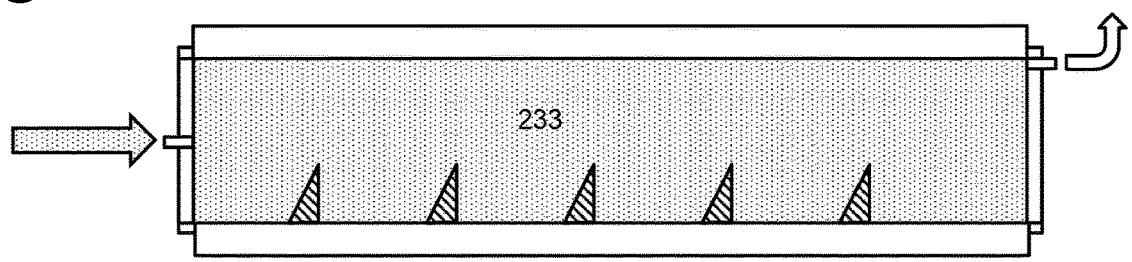
FIG. 20B shows the mold filled with silicone optical resin.

FIG. 20B shows the mold filled with optical silicone resin 233.

Figure 21:
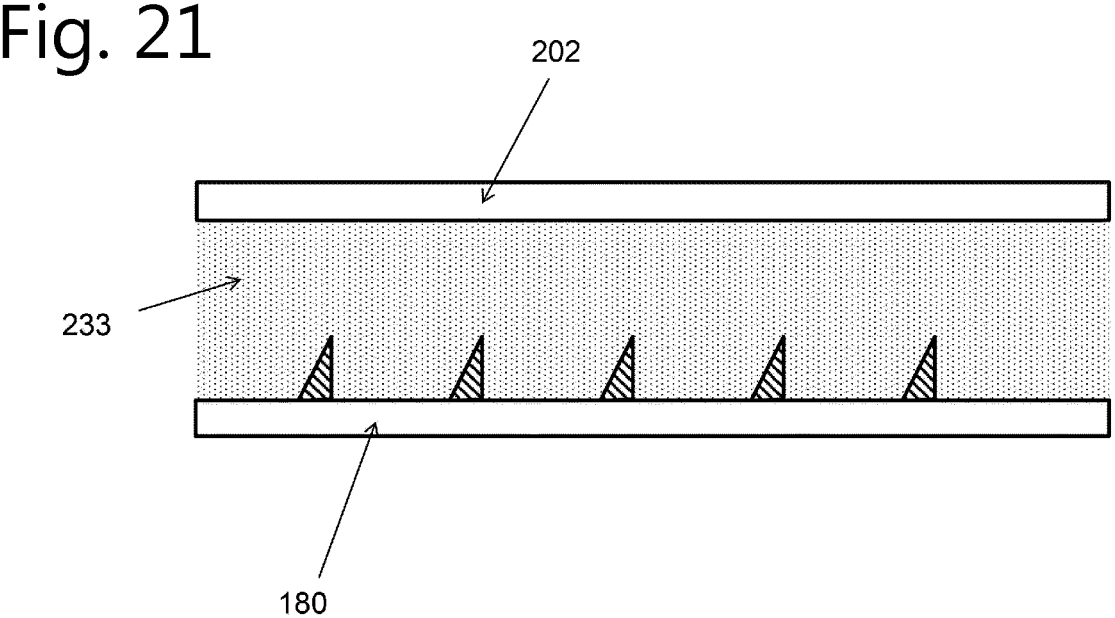
FIG. 21 shows a schematic cross section of an example of an embodiment of the present invention.

FIG. 21 shows the display once the optical silicon resin has hardened and the mold removed.

An advantage of the succession of layers as seen on FIG. 21 is that it reduces the number of interfaces between different media. The absence of e.g. air between the glass substrate 180 and the transparent layer (e.g. optical silicone resin) and between the transparent layer and the spatial reflective light modulator or valve such as comprising the matrix 202 of reflective pixel elements improves the transmission of light and contribute to a higher contrast ratio.

In another example embodiment, the layer of transparent material 233 is formed in absence of the spatial reflective light modulator or valve such as comprising the matrix 202 of reflective pixel elements. In that case, an oil or glue is used when mating the spatial reflective light modulator or valve such as comprising the matrix of reflective pixel elements to the transparent layer.

Figure 22A:
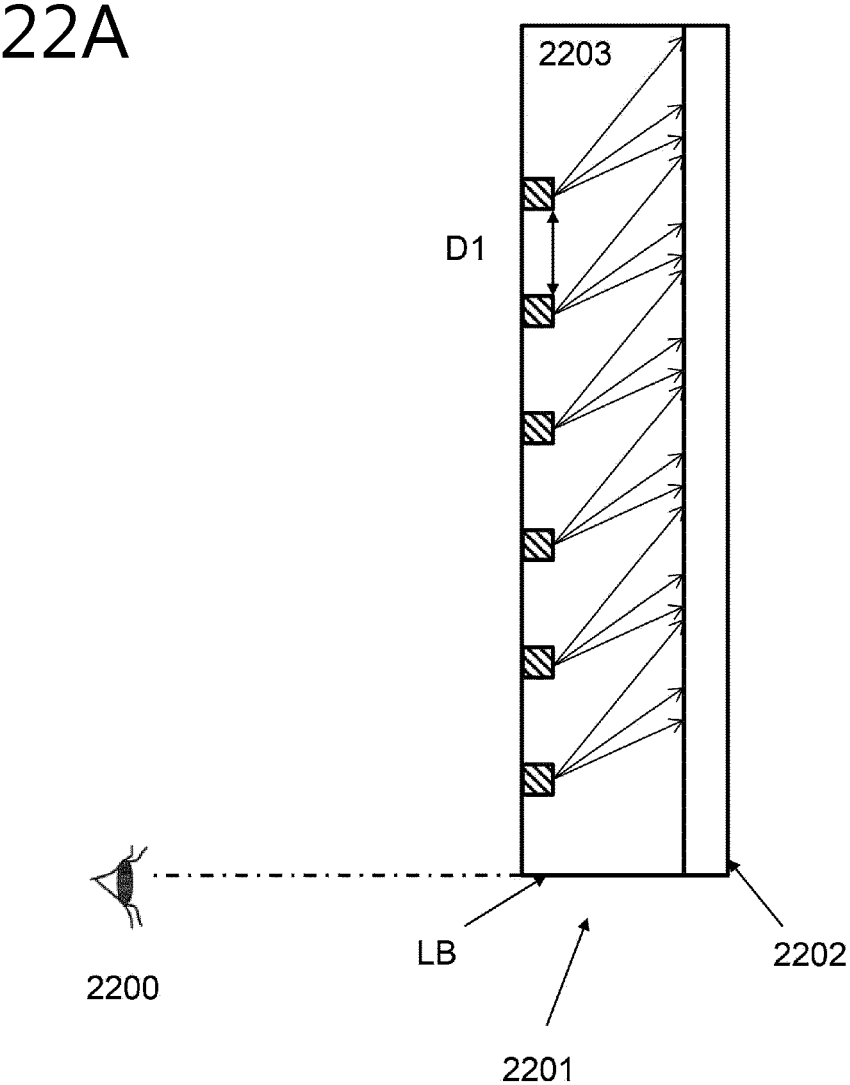
FIG. 22A shows the front lighting dispositive with a matrix of encapsulated diodes with their reflective light shaping means.
Figure 22B:
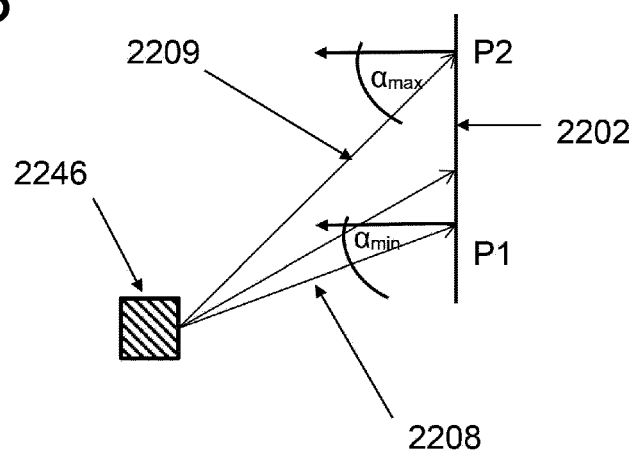
FIG. 22B shows the angle of incidence with which a ray of light propagating in a straight line from the encapsulated diode reaches the spatial reflective light modulator or valve comprising the matrix of reflective pixel elements.

FIG. 22A shows a reflective display making use of a front lighting dispositive as described on FIGS. 10 to 21. In the example, the front lighting dispositive makes use of a matrix of encapsulated diodes with their reflective light shaping means. The encapsulated diodes 2246 are separated by e.g. 15 to 25 mm in both the horizontal and vertical directions (as illustrated on FIG. 23). The angle of incidence with which a ray of light that propagates in a straight line from the encapsulated diode and reach the spatial reflective light modulator or valve such as comprising the matrix 2202 of reflective pixel elements is never smaller than $\alpha_{min}$ as illustrated on FIG. 22B. To increase the power efficiency (and optimize the brightness of the display as seen by a viewer 2200), the angle of incidence (for a ray of light propagating in straight line from the encapsulated diode 2246 to the reflective pixels of matrix 2202) is also limited to $\alpha_{max}$. For instance $\alpha_{min}$ is in the interval 5° to 15° and $\alpha_{max}=\alpha_{min}+\Delta\alpha$ with $\Delta\alpha$ in the interval 5° to 15° or 25°. FIG. 22B represents ray of lights that propagate in a straight line from the encapsulated LED 2246 and reach the matrix 2202 of reflective pixels at point P1 with an angle of incidence $\alpha_{min}$ and at point P2 with an angle of incidence $\alpha_{max}$.

No specular reflection is allowed towards the bottom without prior (multiple) diffuse reflection reflection(s) on diffusing particles in the transparent layer 2203, the first surface of layer 2203 or the matrix 2202 of reflective pixels. The light shaping means direct the light upwards (the upwards direction corresponds to the top of FIGS. 22A and 22B).

This example can be used for e.g. a display in airports to display the time of departure and arrival of planes. This type of display often hangs on walls and their lower border LB is at eye level or higher than eye level. A ray of light that exits the surface of the display 2201 with a downward direction always underwent diffuse reflection in the transparent layer 2203 before reaching the eyes of a viewer 2200.

Figure 23:
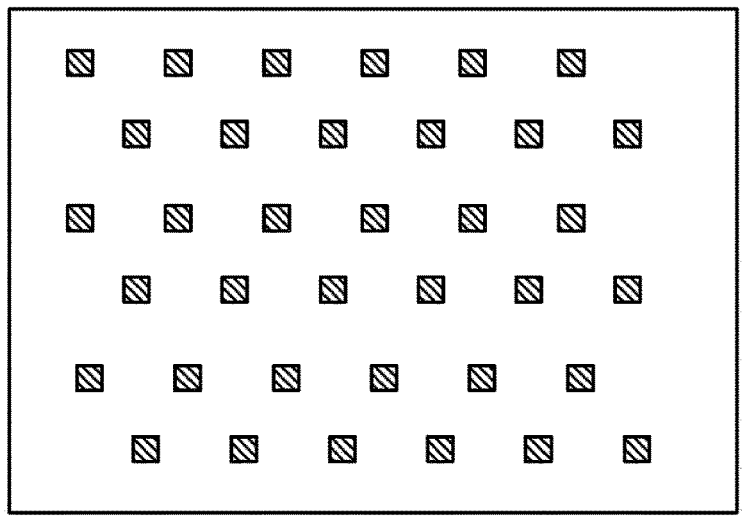
FIG. 23 shows an example of distribution of the light emitting elements and light shaping means across the surface of a display according to an embodiment of the present invention.

FIG. 23 shows an example of distribution of the light emitting elements and light shaping means 2246 across the surface of the display 2201. The light emitting elements form rows. The distance D1 between two adjacent rows is e.g. 10 mm to 25 mm or more depending on the brightness of the light emitting elements, the required uniformity of the light distribution across the display and the desired brightness.

The distance between two adjacent light emitting elements in the same row is D2. Depending on the geometry of the light shaping means, D2 will be smaller, equal to or larger than D1.

Figure 24:
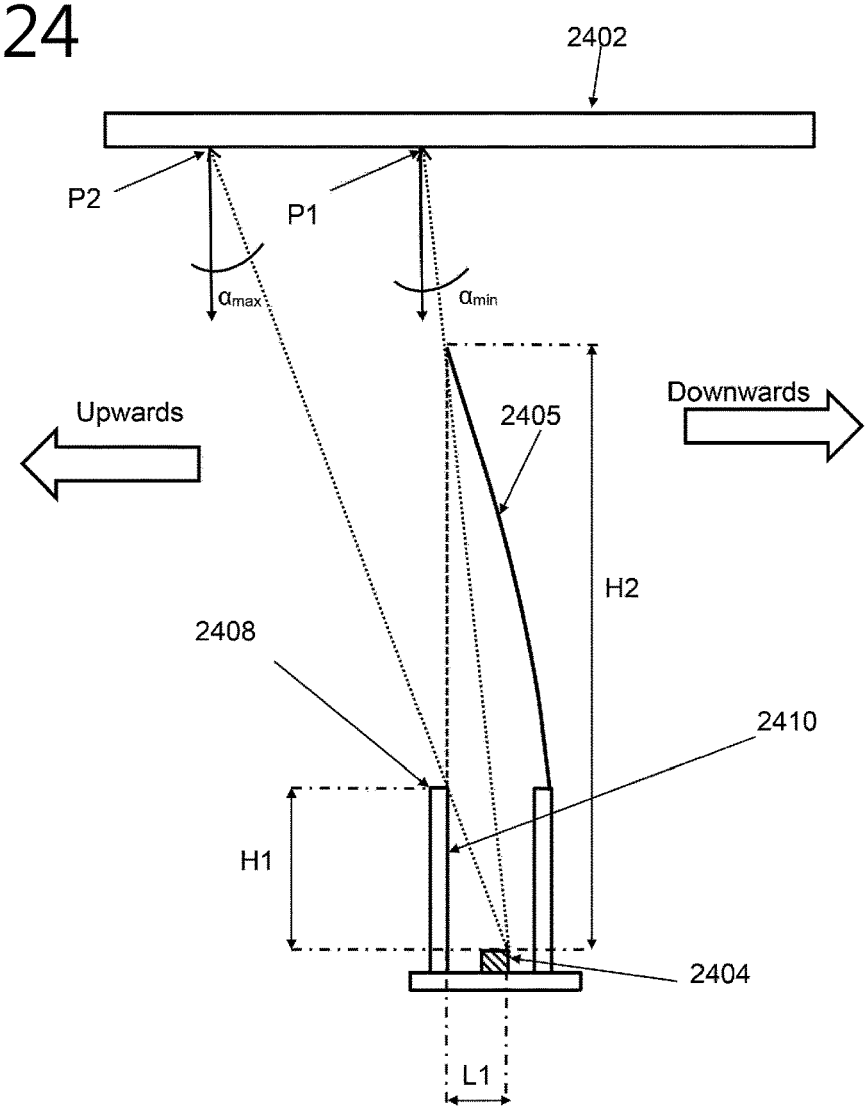
FIG. 24 shows how the angle of incidence can be determined by the geometry and materials of the light shaping means according to an embodiment of the present invention.

FIG. 24 gives more detail on how the angle of incidence $\alpha_{max}$ can be determined by the geometry and materials of the light shaping means. FIG. 24 also shows a variant of reflective light shaping means and how $\alpha_{min}$ can be determined.

A wall 2408 prevents a ray of light emitted by LED 2404 from propagating in a straight line and reaching the matrix of reflective pixels 2402 with an angle of incidence larger than $\alpha_{max}$ with tan $\alpha_{max}$=L1/H1. Some light may still exit the light shaping means and reach the matrix 2402 with an angle of incidence larger than tan $\alpha_{max}$ but in most cases, the angle of incidence will be lower or equal to $\alpha_{max}$ and always be larger or equal to $\alpha_{min}$.

The "downwards" and "upwards" direction corresponding to FIGS. 22A and 22B have been indicated as well to further illustrate the purpose of the reflective surface 2405 of the light shaping means.

The invention claimed is:

1. A reflective display device comprising:
   a spatial reflective light modulator or valve,
   at least one light emitting element being positioned in front of the spatial reflective light modulator or valve,
   a transparent layer positioned at least in part between the at least one light emitting element and the spatial reflective light modulator or valve, and
   light shaping means for directing the light generated by the at least one light emitting element in defined directions with respect to the spatial reflective light modulator or valve.

2. The reflective display device of claim 1, wherein the spatial reflective light modulator or valve comprises an array or matrix of addressable reflective pixel elements.

3. The reflective display device of claim 1, wherein the defined directions exclude one or more intervals of angles of incidences of light from the at least one light emitting element incident on the spatial reflective light modulator or valve, or
   wherein the defined directions include or consist of one or more intervals of angles of incidences of light from the at least one light emitting element on the spatial reflective light modulator or valve.

4. The reflective display device of claim 1, further comprising a plurality of light emitting elements wherein each of the light emitting elements emits in or within the defined directions.

5. The reflective display device of claim 1, wherein light emitted by the at least one light emitting element is constrained not to be incident on the spatial reflective light modulator or valve within one or more intervals of the angle of incidence, thereby preventing or reducing specular reflection in known directions.

6. The reflective display device of claim 5, wherein the prevention of the reduction of specular reflection in known directions results in directions along which a viewer will not see specular image(s) of the at least one light emitting element on the spatial reflective light modulator or valve or will only see weakened images of the same at some angles.

7. The reflective display device of claim 1, wherein the light shaping means are configured for directing the light emitted by the at least one light emitting element by refraction, or reflection or a combination of both, or
   wherein the light shaping means are a volume of transparent material having a surface, the transparent material having an index of refraction different from the index of refraction of the transparent layer.

8. The reflective display device of claim 7, wherein the volume of transparent material is positioned between the at least one light emitting element and the spatial reflective light modulator or valve, or
   wherein the volume of transparent material has a lenticular shape and has an axis of symmetry, or
   wherein the volume of transparent material is rotationally asymmetrical about a normal to the spatial reflective light modulator or valve.

9. The reflective display device of claim 7, wherein the light shaping means has a surface with a first reflective side and a second absorbing or diffusive side, the first reflective side intercepting light emitted by the at least one light emitting element and redistributing it in defined angular ranges or intervals of an angle of incidence of light from the at least one light emitting element on the spatial reflective light modulator or valve.

10. The reflective display device of claim 1, wherein the light shaping means is cone or pencil shaped or pyramidal with a square base, or an obelisk, or parallelepiped with or without a pyramidion and encloses the at least one light emitting element, or
    wherein the light shaping means is a cavity in the transparent layer.

11. The reflective display device of claim 10, wherein the cavity is cone or pencil shaped or pyramidal with a square base, or an obelisk, or parallelepiped with or without a pyramidion and encloses the at least one light emitting element.

12. The reflective display device of claim 10, wherein the cavity is filled with a material with an index of refraction smaller than the index of refraction of the transparent layer.

13. The reflective display device of claim 12, wherein the material is a gas.

14. A method of operating a reflective display device comprising a spatial reflective light modulator or valve, at least one light emitting element being positioned in front of the spatial reflective light modulator or valve, a transparent layer positioned at least in part between the at least one light emitting element and the spatial reflective light modulator or valve, and light shaping means for directing the light generated by the at least one light emitting element in defined directions with respect to the spatial reflective light modulator or valve, the method comprising:
    directing the light generated by the at least one light emitting element in defined directions with respect to the spatial reflective light modulator or valve using the light shaping means,
    wherein the light generated by the at least one light emitting element is directed by refraction, or reflection, or a combination of both.

15. The method of claim 14, wherein the spatial reflective light modulator or valve comprises an array or matrix of addressable reflective pixel elements, the method comprising addressing the reflective pixel elements to form an image.

16. The method of claim 14, wherein the defined directions exclude one or more intervals of angles of incidences of light from the at least one light emitting element incident on the spatial reflective light modulator or valve, or
    wherein the defined directions include or consist of one or more intervals of angles of incidences of light from the at least one light emitting element on the spatial reflective light modulator or valve.

17. The method of claim 14, wherein the reflective display device further comprises a plurality of light emitting elements, the method comprising each of the light emitting elements emitting in or within the defined directions.

18. The method of claim 14, wherein light emitted by the at least one light emitting element is constrained not to be incident on the spatial reflective light modulator or valve within one or more intervals of the angle of incidence, thereby preventing or reducing specular reflection in known directions.

19. The method of claim 18, wherein the prevention or the reduction of specular reflection in known directions results in directions along which a viewer will not see specular image(s) of the at least one light emitting element on the spatial reflective light modulator or valve or will only see weakened images of the same at some angles.

20. The method of claim 14, wherein the a light shaping means has a surface with a first reflective side and a second absorbing or diffusive side, the method comprising intercepting light emitted by the at least one light emitting element at the first reflective side and redistributing it in defined angular ranges or intervals of an angle of incidence of light from the at least one light emitting element on the spatial reflective light modulator or valve.

\* \* \* \* \*